(12) United States Patent
Maeda

(10) Patent No.: US 10,384,555 B2
(45) Date of Patent: Aug. 20, 2019

(54) FEED SYSTEM AND VEHICLE

(71) Applicant: Toyota Jidosha Kabushiki Kaisha, Toyota-shi Aichi-ken (JP)

(72) Inventor: Jun Maeda, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 120 days.

(21) Appl. No.: 15/801,959

(22) Filed: Nov. 2, 2017

(65) Prior Publication Data
US 2018/0141456 A1    May 24, 2018

(30) Foreign Application Priority Data
Nov. 15, 2016 (JP) .................. 2016-222299

(51) Int. Cl.
| | |
|---|---|
| B60L 9/00 | (2019.01) |
| B60L 11/00 | (2006.01) |
| G05D 1/00 | (2006.01) |
| G05D 3/00 | (2006.01) |
| G06F 7/00 | (2006.01) |
| G06F 17/00 | (2019.01) |
| B60L 11/18 | (2006.01) |
| B60W 10/06 | (2006.01) |

(Continued)

(52) U.S. Cl.
CPC ........... *B60L 11/1862* (2013.01); *B60L 50/15* (2019.02); *B60L 53/14* (2019.02); *B60L 53/60* (2019.02); *B60L 55/00* (2019.02); *B60W 10/06* (2013.01); *B60W 10/26* (2013.01); *B60W 20/00* (2013.01); *H04Q 9/00* (2013.01); *B60L 2250/16* (2013.01); *B60L 2250/22* (2013.01); *B60W 2900/00* (2013.01); *H02J 7/0068* (2013.01); *H04Q 2209/70* (2013.01); *Y02E 60/721* (2013.01); *Y02T 10/7005* (2013.01); *Y02T 10/7072* (2013.01); *Y02T 10/7077* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01); *Y10S 903/93* (2013.01)

(58) Field of Classification Search
CPC .......... B60L 11/60; B60L 50/15; B60L 53/14; B60W 10/06; B60W 10/26; B60W 20/00
USPC ............................................. 701/22
See application file for complete search history.

(56) References Cited

U.S. PATENT DOCUMENTS

| | | |
|---|---|---|
| 2006/0250902 A1 | 11/2006 | Bender et al. |
| 2007/0282495 A1 | 12/2007 | Kempton et al. |
| 2012/0089290 A1* | 4/2012 | Kato ............... B60W 20/10 701/22 |

FOREIGN PATENT DOCUMENTS

| | | | |
|---|---|---|---|
| JP | 2015122892 A | 7/2015 | |
| WO | 2010/042550 A2 | 4/2010 | |
| WO | WO-2010042550 A2 * | 4/2010 | ............. G06Q 10/06 |

* cited by examiner

*Primary Examiner* — Mahmoud S Ismail
(74) *Attorney, Agent, or Firm* — Dinsmore & Shohl LLP

(57) ABSTRACT

A feed system includes a vehicle and a feed mode controller. The feed system feeds electric power to an electric load outside the vehicle in a first feed mode or a second feed mode. A wireless communication device of the vehicle communicates in a first communication system in which communication with a portable terminal is established without passing through a relay point. The feed mode controller enables the first feed mode to be selected when the communication in the first communication system is established, (Continued)

and disables the first feed mode from being selected when the communication in the first communication system is not established.

9 Claims, 11 Drawing Sheets

(51) Int. Cl.
*B60W 10/26* (2006.01)
*B60W 20/00* (2016.01)
*H04Q 9/00* (2006.01)
*B60L 53/14* (2019.01)
*B60L 50/15* (2019.01)
*B60L 53/60* (2019.01)
*B60L 55/00* (2019.01)
*H02J 7/00* (2006.01)

FEED SYSTEM AND VEHICLE

CROSS-REFERENCE TO RELATED APPLICATION

This application claims priority to Japanese Patent Application No. 2016-222299 filed on Nov. 15, 2016, the entire contents of which are incorporated herein by reference.

BACKGROUND

1. Technical Field

The disclosure relates to a feed system and a vehicle that feed electric power from the vehicle to an external electric load using a portable terminal.

2. Description of Related Art

There is a feed system that supplies (feeds) electric power to an electric load of a house or the like outside of a hybrid vehicle, by adopting, as an electric power source, an electric power generating device that generates the electric power using an electric storage device and engine equipped in the hybrid vehicle.

Examples of feed modes for supplying the electric power from the hybrid vehicle to the electric load outside of the vehicle include a feed mode in which the electric power is supplied from the electric storage device to the electric load in a state the engine is stopped (hereinafter, referred to as an electric vehicle (EV) feed mode) and a feed mode in which the electric power generated using the engine is supplied to the electric load while the engine is acting (hereinafter, referred to as a hybrid vehicle (HV) feed mode).

For example, Japanese Patent Application Publication No. 2015-122892 discloses a technology allowing the selection of one of the HV feed mode and the EV feed mode using a switch provided on a feed connector that is attachable to the vehicle.

SUMMARY

In the feed system having the above-described configuration, when a user selects the HV feed mode involving the action of the engine, it is desired that the user be at a place where the user can confirm whether the situation in the vicinity of the vehicle is a situation in which the start of the engine may be permitted.

However, if the user needs to be at a place where the user can confirm the situation in the vicinity of the vehicle in the same way for various operations about the feed of the electric power, the user cannot perform an operation such as the check of the feed condition at a remote location, for example, using a portable terminal, and sometimes, cannot perform a convenient electric power feed.

The disclosure provides a feed system and a vehicle that make it possible to perform a convenient electric power feed in a feed system having a feed mode for feeding electric power while the engine is acting.

A first aspect of the disclosure is a feed system. The feed system is configured to feed electric power in one of a first feed mode and a second feed mode. The feed system includes a vehicle and a feed mode controller. The vehicle includes an engine, an electric power generating device, an electric storage device, an outlet and a wireless communication device. The electric power generating device is configured to generate electric power by dynamic power of the engine. The outlet is configured to be connected to an electric load outside of the vehicle. The wireless communication device is configured to perform wireless communication in at least one of a first communication system and a second communication system, the first communication system being a communication system in which communication with a portable terminal is established without passing through a relay point, the second communication system being a communication system in which the communication with the portable terminal is established while passing through the relay point. The feed mode controller is configured to enable the first feed mode to be selected by an operation of the portable terminal when the communication in the first communication system is established between the portable terminal and the vehicle. The feed mode controller is configured to disable the first feed mode from being selected by the operation of the portable terminal when the communication in the first communication system is not established between the portable terminal and the vehicle. The first feed mode is a mode in which electric power of at least one of the electric power generating device and the electric storage device is supplied to the electric load when actuation of the engine is allowable. The second feed mode is a mode in which electric power of the electric storage device is supplied to the electric load when the engine is stopped.

With this configuration, when the communication in the first communication system is established, the user can select the first feed mode even outside of the vehicle, by using the portable terminal in a range of the distance allowing the communication with the vehicle in the first communication system. Therefore, it is possible to perform a convenient electric power feed. Further, the distance in which the communication can be established without passing through the relay point is a close distance from the vehicle, and therefore, the user can select the first feed mode in a situation in which the user can confirm the vicinity of the vehicle. Furthermore, when the communication in the first communication system is not established, the user is likely to be at a remote location. Therefore, in such a case, the first feed mode is disabled from being selected by the operation of the portable terminal, and thereby, it is possible to inhibit the first feed mode from being selected at a remote location.

In the feed system, the feed mode controller may be configured to enable the second feed mode to be selected when the communication in the first communication system is established between the portable terminal and the vehicle.

With this configuration, it is possible to perform the selection of the feed mode even outside of the vehicle, by using the portable terminal. Therefore, it is possible to perform a convenient electric power feed.

In the feed system, the feed mode controller may be configured to enable the second feed mode to be selected when the communication in the second communication system is established between the portable terminal and the vehicle.

At the time of the feed of the electric power in the second feed mode, the engine is put into a stop state, and therefore, the user does not need to confirm the vicinity of the vehicle. Therefore, in the case of the establishment of the communication in the second communication system, which allows the communication from a remote location beyond the range of the communication in the first communication system because of passing through the relay point, it is possible to select the second feed mode at a remote location, by enabling the second feed mode to be selected.

In the feed system, the feed mode controller may be configured to disable each of the first feed mode and the second feed mode from being selected when the communication in the first communication system is not established between the portable terminal and the vehicle.

With this configuration, when the communication in the first communication system is not established, the user is likely to be at a remote location. Therefore, in such a case, the first feed mode and the second feed mode are disabled from being selected, and thereby, it is possible to inhibit the first feed mode and the second feed mode from being selected at a remote location.

In the feed system, the feed mode controller may be configured to prohibit the first feed mode from being selected when a selection request for the first feed mode is sent from the portable terminal and the communication in the first communication system is not established between the portable terminal and the vehicle.

With this configuration, when the communication in the first communication system is not established, the user is likely to be at a remote location. Therefore, the first feed mode is prohibited from being selected even when the selection request for the first feed mode is sent from the portable terminal, and thereby, it is possible to inhibit the first feed mode from being selected at a remote location.

In the feed system, the portable terminal may include a display device. The display device may be configured to display a selection screen for the first feed mode and the second feed mode. The feed mode controller may be configured to disable the first feed mode from being selected on the selection screen of the portable terminal when the communication in the first communication system is not established between the portable terminal and the vehicle.

With this configuration, since the first feed mode is disabled from being selected on the selection screen of the portable terminal, it is possible to avoid the first feed mode from being selected on the portable terminal.

The feed system may further include a feed controller configured to enable a preset action about the feed of the electric power by the operation of the portable terminal when the feed of the electric power to the electric load is started and the communication in one of the first communication system and the second communication system is established.

With this configuration, it is possible to perform the preset action about the feed of the electric power, even at a remote location, through the communication in the second communication system via the relay point, and therefore, it is possible to perform a convenient electric power feed.

In the feed system, the preset action may include at least one of an action of changing a first threshold of the state-of-charge of the electric storage device, an action of changing a second threshold of the remaining level of fuel for the engine and an action of stopping the feed of the electric power, the first threshold being a threshold for giving a notice of information about the state-of-charge, the second threshold being a threshold for giving a notice of information about the remaining level of the fuel.

With this configuration, it is possible to perform at least one of the action of changing the first threshold of the state-of-charge (SOC), which is a threshold for stopping the feed of the electric power at a remote location through the communication in the second communication system via the relay point, the action of changing the second threshold of the remaining level of the fuel, which is a threshold for sopping the feed of the electric power, and the action of stopping the feed of the electric power.

A second aspect of the disclosure is a vehicle. The vehicle includes an engine, an electric power generating device, an electric storage device, an outlet, a wireless communication device and an electronic control unit. The electric power generating device is configured to generate electric power by dynamic power of the engine. The outlet is configured to be connected to an electric load outside of the vehicle. The wireless communication device is configured to perform wireless communication in at least one of a first communication system and a second communication system. The first communication system is a communication system in which communication with a portable terminal is established without passing through a relay point. The second communication system is a communication system in which the communication with the portable terminal is established while passing through the relay point. The electronic control unit is configured to execute feed of electric power in one of a first feed mode and a second feed mode. The first feed mode is a mode in which electric power of at least one of the electric power generating device and the electric storage device is supplied to the electric load when actuation of the engine is allowable. The second feed mode is a mode in which electric power of the electric storage device is supplied to the electric load when the engine is stopped. The electronic control unit is configured to enable the first feed mode to be selected by an operation of the portable terminal only when the communication in the first communication system is established between the portable terminal and the vehicle.

According to the configuration, when the communication in the first communication system is established, the user can perform the selection of the feed mode even outside of the vehicle, by using the portable terminal in a range of the distance allowing the communication with the vehicle in the first communication system. Therefore, it is possible to perform a convenient electric power feed. Further, the distance in which the communication can be established without passing through the relay point is a close distance from the vehicle, and therefore, the user can select the first feed mode in a situation in which the user can confirm the vicinity of the vehicle.

The disclosure can provide a feed system and a vehicle that make it possible to perform a convenient electric power feed in a feed system having a feed mode for feeding electric power while the engine is acting.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
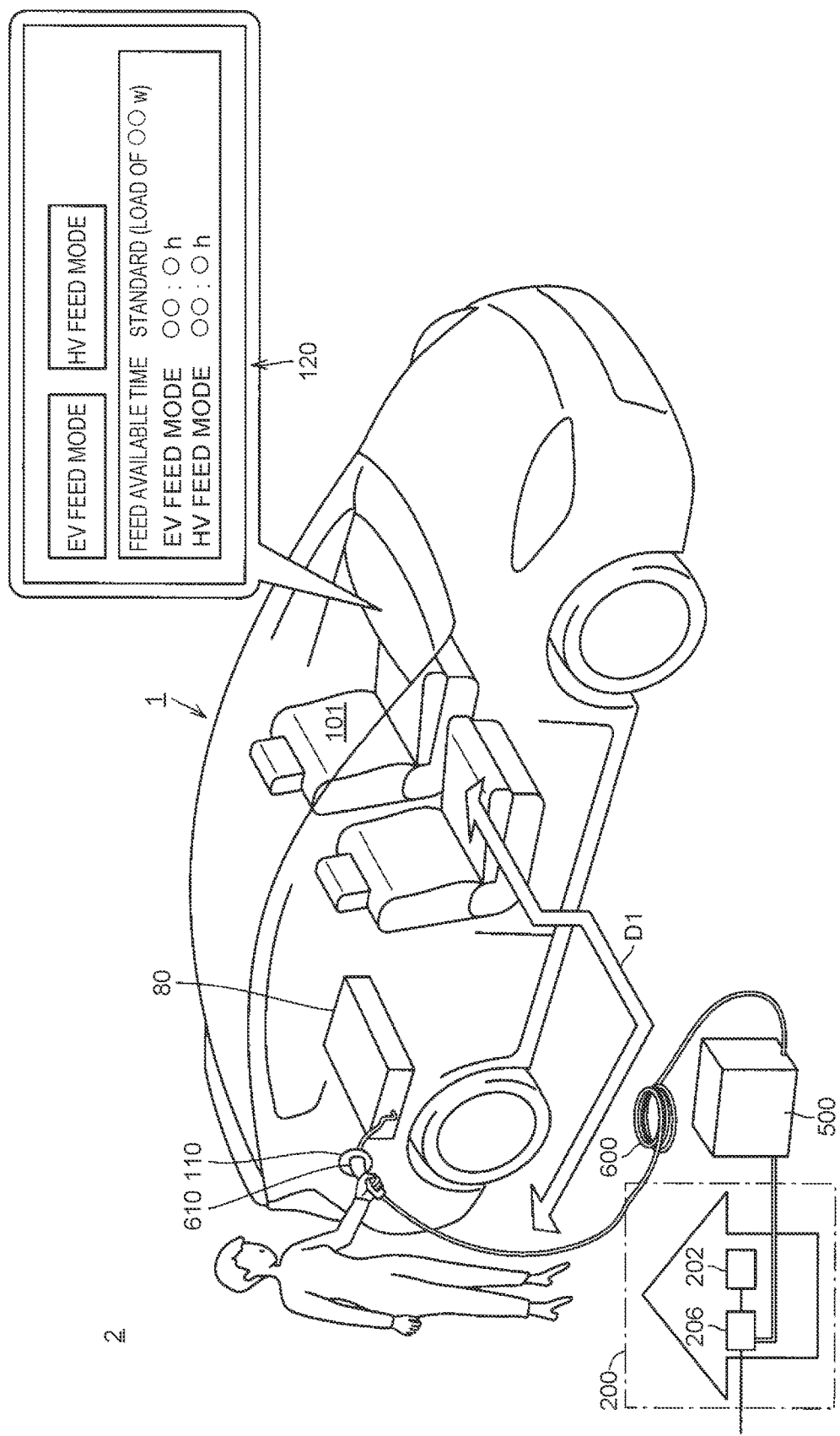
FIG. 1 is a diagram showing a schematic diagram of a feed system.

Hereinafter, embodiments of the disclosure will be described in detail, with reference to the drawings. In the drawings, identical reference characters are assigned to identical or corresponding parts, and the descriptions are not repeated.

Overview of Feed System

FIG. 1 is a diagram showing a schematic diagram of a feed system 2. As shown in FIG. 1, the feed system 2 includes a vehicle 1 that is equipped with a battery 80, an electric load such as a household electric appliance 202 in a house 200, portable terminals 300 (see FIG. 2), a feed device 500 that converts electric power of the battery 80 into predetermined electric power and then supplies the electric power to the house 200, and a connection cable 600 that connects the vehicle 1 and the feed device 500.

The vehicle 1 includes the battery 80, seats 101, a touch panel display 120 and a direct current (DC) outlet 110. The vehicle 1 only needs to be a hybrid vehicle equipped with an engine, an electric power generating device that can generate electric power using dynamic power of the engine, and the battery 80 that can supply electric power to an electric load outside of the vehicle 1. A detailed configuration of the vehicle 1 will be described later.

The battery 80 is an electric power source for supplying electric power to motor generators (see FIG. 2) that drives the vehicle 1. The touch panel display 120 is provided at a position that allows a user to view the touch panel display 120 when the user sits on the seat 101. The touch panel display 120 displays a variety of information, and accepts predetermined operations by the user. At the time of the feed of electric power from the vehicle 1 to the electric load, the touch panel display 120 displays information about the feed of the electric power. The DC outlet 110 is electrically connected to the battery 80, at the time of the feed of the electric power. The DC outlet 110 is provided at a predetermined position on an external body of the vehicle 1 (for example, at a fender portion above a right rear wheel of the vehicle 1). On the DC outlet 110, for example, a cover for covering the DC outlet 110 may be provided. The DC outlet 110 is an example of the outlet.

At one end of the connection cable 600, a feed connector 610 is provided. The feed connector 610 has a shape that allows the attachment to the DC outlet 110. Each of the DC outlet 110 and the feed connector 610 is provided with a plurality of terminals. The feed connector 610 is attached to the DC outlet 110, so that the terminals of the feed connector 610 and the terminals of the DC outlet 110 are electrically connected to each other. The other end of the connection cable 600 is connected to the feed device 500. Therefore, in a state where the feed connector 610 is connected to the DC outlet 110, the battery 80 and the feed device 500 are electrically connected to each other at the time of the feed of the electric power.

The feed device 500 is connected to a switchboard 206 in the house 200. At the time of the feed of the electric power, the feed device 500 converts direct-current electric power of the battery 80 into alternating-current electric power, and supplies the alternating-current electric power after the conversion, to the switchboard 206. The switchboard 206 selects one of the alternating-current electric power from a utility grid and the alternating-current electric power from the feed device 500, or combines them, to supply the electric power to the household electric appliance 202. The switchboard 206 regulates the ratio between the electric power from the utility grid and the electric power from the feed device 500 in the electric power to be supplied to the household electric appliance 202, for example, depending on a control signal from an unillustrated control device, an operation by the user, the supply amount of the electric power from the feed device 500, or the like.

For example, when the user performs the following operations, the feed device 500 feeds the electric power to the household electric appliance 202. First, the user connects the feed connector 610 to the DC outlet 110 of the vehicle 1.

When the feed connector 610 is connected to the DC outlet 110, a selection screen for a feed mode is displayed on the touch panel display 120. On the selection screen, for example, there are displayed a rectangular region in which a character string "EV FEED MODE" is displayed and a rectangular region in which a character string "HV FEED MODE" is displayed. Below the rectangular regions, estimated values of feed available times when the feed modes are selected are displayed.

When the user moves to the interior of the vehicle 1 and then performs a touch operation (for example, a tap operation or the like) to a rectangular region that is of the rectangular regions displayed on the touch panel display 120 and that corresponds to a desired feed mode, the feed mode corresponding to the selected rectangular region is selected. The vehicle 1 is controlled depending on the selected feed mode.

The EV feed mode is a feed mode in which the electric power of the battery 80 is supplied to the house 200 in a state where the engine (see FIG. 2) is stopped. The HV feed mode is a feed mode in which the electric power generated using the engine is supplied to the house 200 while the engine is acting.

After the user selects the feed mode, the user starts the feed of the electric power by operating a feed start switch (see FIG. 2) of the feed device 500. Then, the feed device 500 is actuated. Thereby, the direct-current electric power of the battery 80 is converted into the alternating-current electric power, and the alternating-current electric power after the conversion is supplied to the house 200.

Detailed Configuration of Feed System

Figure 2:
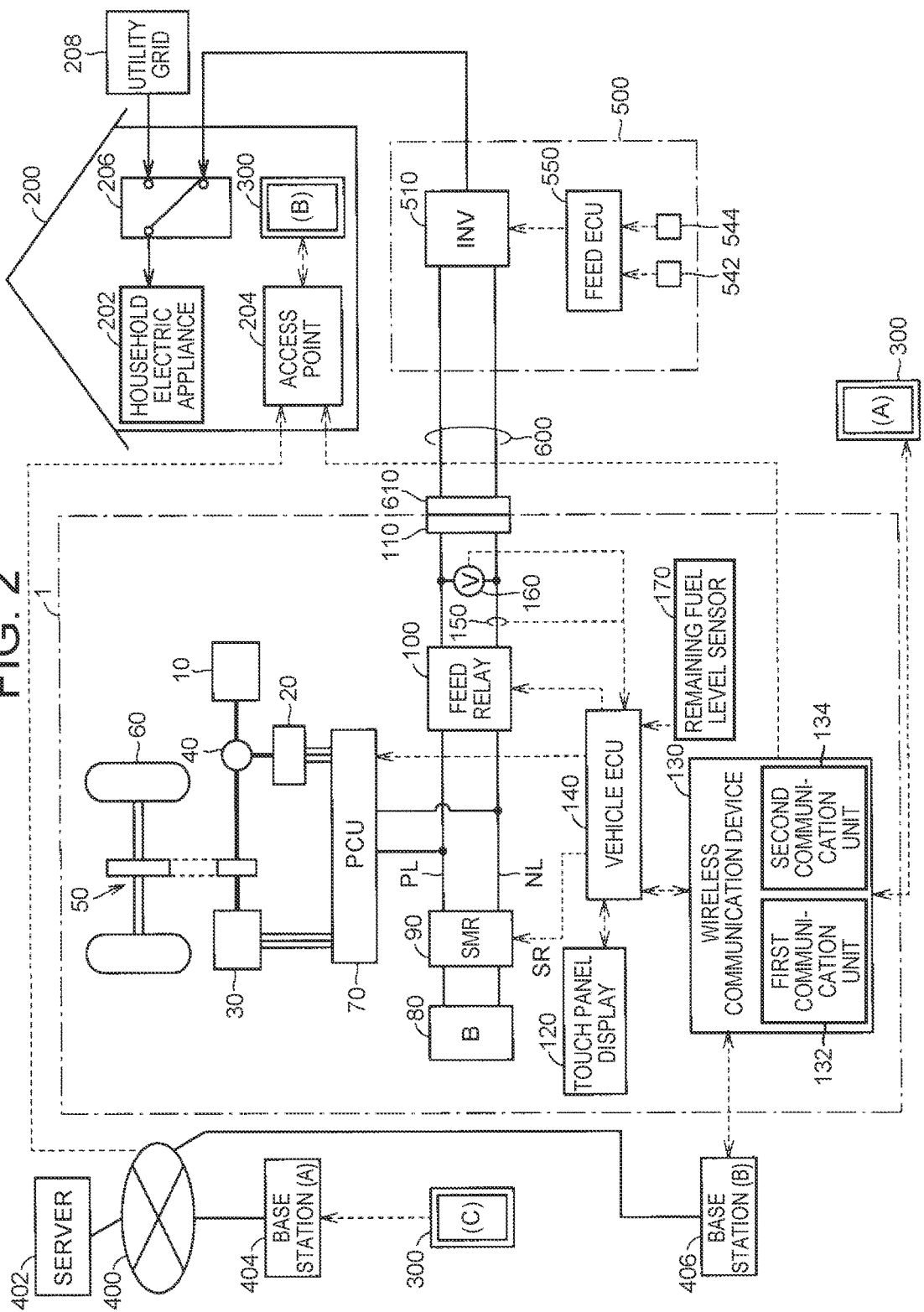
FIG. 2 is a block diagram showing a detailed configuration of the feed system.

FIG. 2 is a block diagram showing a detailed configuration of the feed system 2 equipped in the hybrid vehicle according to the embodiment.

As shown in FIG. 2, the vehicle 1 includes an engine 10, a first MG 20, a second MG 30, a dynamic power dividing device 40, a final reduction gear 50, driving wheels 60, a power control unit (PCU) 70, the battery 80, a system main relay (hereinafter, referred to as an SMR) 90, a feed relay 100, the DC outlet 110, the touch panel display 120, a wireless communication device 130, a vehicle electronic control unit (ECU) 140, a current sensor 150, a voltage sensor 160, and a remaining fuel level sensor 170.

The vehicle 1 travels using dynamic power of at least one of the engine 10 and the second MG 30. The vehicle 1 can switch the traveling mode of the vehicle 1 between an electric vehicle traveling (EV traveling) in which the dynamic power of the engine 10 is not used and the dynamic power of the second MG 30 is used and a hybrid vehicle traveling (HV traveling) in which the dynamic powers of both of the engine 10 and the second MG 30 are used.

The engine 10 is an internal combustion engine such as a gasoline engine or a diesel engine. The engine 10 generates the dynamic power for the traveling of the vehicle 1, in response to a control signal from the vehicle ECU 140. The dynamic power generated in the engine 10 is output to the dynamic power dividing device 40.

For example, each of the first MG 20 and the second MG 30 is a three-phase alternating-current permanent magnet synchronous motor. An output shaft of the engine 10, a rotational shaft of the first MG 20 and a rotational shaft of the second MG 30 are mechanically linked with rotational elements of the dynamic power dividing device 40.

The dynamic power dividing device 40 is mechanically linked with the output shaft of the engine 10, the rotational shaft of the first MG 20 and the rotational shaft of the second MG 30, and is configured to be capable of transmitting torque among the engine 10, the first MG 20 and the second MG 30. Specifically, the dynamic power dividing device 40 is a planetary gear mechanism. The planetary gear mechanism includes a sun gear, a ring gear, a carrier and pinion gears, as rotational elements. The sun gear, which is an external gear, is disposed at the center. Each of the plurality of pinion gears is provided so as to engage with the sun gear, and the ring gear, which is an internal gear, is provided so as to engage with each of the plurality of pinion gears. The plurality of pinion gears is held by the carrier, in a rotatable and revolvable manner. The sun gear is mechanically linked with the rotational shaft of the first MG 20. The carrier is mechanically linked with the output shaft of the engine 10. The ring gear is mechanically linked with the rotational shaft of the second MG 30. The driving wheels 60 are linked through the final reduction gear 50 with a rotational shaft that connects the dynamic power dividing device 40 and the second MG 30.

The battery 80 is an electric storage device configured to be rechargeable. The battery 80, typically, is configured by a secondary battery such as a nickel-hydrogen secondary battery or a lithium-ion secondary battery. As the electric storage device, a capacitor such as an electric double layer capacitor may be used.

The SMR 90 is connected to each of a positive electrode terminal and a negative electrode terminal of the battery 80. Further, the SMR 90 is connected to the feed relay 100 through electric power lines PL, NL. In the middle of the electric power lines PL, NL, electric power lines diverge, and are connected to the PCU 70. When a contact point of the SMR 90 is opened, the connection between the battery 80 and the feed relay 100 becomes an electrical cut-off state, and the connection between the battery 80 and the PCU 70 becomes an electrical cut-off state. On the other hand, when the contact point of the SMR 90 is closed, the connection between the battery 80 and the feed relay 100 becomes an electrical conduction state, and the connection between the battery 80 and the PCU 70 becomes an electrical conduction state. The SMR 90 switches to one of the opening state and the closing state, in response to a control signal from the vehicle ECU 140. For example, at the time of the feed of the electric power, the SMR 90 switches to the closing state.

The PCU 70 raises the voltage of the direct-current electric power stored in the battery 80, converts the direct-current electric power after raising the voltage into alternating-current electric power, and supplies the alternating-current electric power after the conversion, to at least one of the first MG 20 and the second MG 30. Further, the PCU 70 converts the alternating-current electric power generated in at least one of the first MG 20 and the second MG 30, into direct-current electric power, drops the voltage of the direct-current electric power after the conversion to a voltage appropriate for charge, and then supplies the direct-current electric power to the battery 80.

At the time of the start of the engine 10, the first MG 20 is controlled by the PCU 70, so as to rotate the output shaft of the engine 10 using the electric power of the battery 80. After the start of the engine 10, the first MG 20 is controlled by the PCU 70, so as to generate electric power using the dynamic power of the engine 10. Further, the alternating-current electric power generated by the first MG 20 is supplied to the battery 80 (the battery 80 and the DC outlet 110 when the feed relay 100 is in the closing state) via the PCU 70, and in addition, is sometimes supplied to the second MG 30 via the PCU 70.

The second MG 30 drives the driving wheels 60 using at least one of the electric power supplied from the battery 80 and the electric power generated by the first MG 20. In addition, the second MG 30 can generate electric power at the time of regenerative braking.

The feed relay 100 is connected to the DC outlet 110. Therefore, when a contact point of the feed relay 100 is opened, the connection between the DC outlet 110 and the SMR 90 becomes an electrical cut-off state, and the connection between the DC outlet 110 and the PCU 70 becomes an electrical cut-off state. On the other hand, when the contact point of the feed relay 100 is closed, the connection between the DC outlet 110 and the SMR 90 becomes an electrical conduction state, and the connection between the DC outlet 110 and the PCU 70 becomes an electrical conduction state. The feed relay 100 switches to one of the opening state and the closing state, in response to a control signal from the vehicle ECU 140. For example, at the time of the feed of the electric power, the feed relay 100 switches to the closing state.

The first MG 20 in the embodiment is an example of the electric power generating device. That is, at the time of the feed of the electric power in the HV feed mode, the electric power generated in the first MG 20 using the dynamic power of the engine 10 is supplied to the electric load outside of the vehicle 1 via the DC outlet 110. In this case, in addition to the generated electric power, the electric power of the battery 80 may be supplied to the electric load outside of the vehicle 1. At the time of the feed of the electric power in the EV mode, only the electric power of the battery 80 is supplied to the electric load outside of the vehicle 1 via the DC outlet 110.

The current sensor 150 detects the electric current that flows through electric power lines between the feed relay 100 and the DC outlet 110. The current sensor 150 sends a signal indicating the detection result, to the vehicle ECU 140. The voltage sensor 160 detects the voltage of the electric power lines between the feed relay 100 and the DC outlet 110. The voltage sensor 160 sends a signal indicating the detection result, to the vehicle ECU 140. The remaining fuel level sensor 170 detects the remaining level of fuel in a fuel tank (not illustrated). The remaining fuel level sensor 170 sends a signal indicating the detection result, to the vehicle ECU 140.

The wireless communication device 130 can communicate with a base station for portable phones or another device having a communication function outside of the vehicle 1, via an antenna (not illustrated) that is provided on the external body of the vehicle 1, in the interior of the vehicle 1, or within the wireless communication device 130. In the embodiment, the wireless communication device 130 is configured to be capable of communicating with each of the portable terminal 300 possessed by the user, a base station (B) 406 in the periphery of the vehicle 1 and an access point 204 in the house 200. Furthermore, the wireless communication device 130 is configured to be capable of establishing communications in a plurality of communication systems, in a parallel way, in response to a control signal from the vehicle ECU 140. Here, the establishment of communication means that two or more communication devices become a state where data can be sent and received among the communication devices.

In the embodiment, the wireless communication device 130 includes a first communication unit 132 and a second communication unit 134.

The first communication unit 132 is configured to be capable of establishing a communication in a first communication system in which data can be sent and received between the first communication unit 132 and the portable terminal 300 without passing through a relay point (for example, a base station (A) 404, the base station (B) 406, a server 402 or an access point 204). The first communication system is a wireless communication system allowing a direct signal exchange between the portable terminal 300 and the first communication unit 132, and for example, is a communication system that uses a wireless communication standard such as Bluetooth (R). For example, the first communication system is a communication system that uses a single wireless communication standard.

For example, the first communication unit 132 can establish the communication with the portable terminal 300 in the first communication system, when the first communication unit 132 detects that the portable terminal 300 is positioned in a range of the distance allowing the establishment of the communication in the first communication system, through a predetermined electric wave emitted from the portable terminal 300, or the like.

The second communication unit 134 is configured to be capable of establishing a communication in a second communication system in which data can be sent and received between the second communication unit 134 and the portable terminal 300 while passing through a relay point. For example, the second communication system is a wireless communication system that uses a wireless local area network (LAN) typified by IEEE802.11 and the like or a wireless communication standard for portable phones such as 2G, 3G, 4G and 5G and that allows a signal exchange via the relay point. Examples of the wireless communication standard for portable phones include Long Term Evolution (LTE), LTE-Advanced and Worldwide Interoperability for Microwave Access (WiMAX). The second communication system only needs to allow the connection via the relay point as described above. For example, the wireless communication standard to be used between the portable terminal and the relay point and the wireless communication standard to be used between the second communication unit 134 and the relay point may be different from each other, or may be identical to each other.

The establishment of the communication in the first communication system is performed in a range allowing a direct signal exchange between the first communication unit 132 and the portable terminal 300. Therefore, the first communication system is a communication system that allows a communication in a closer distance than the second communication system via the relay point (that is, the first communication system has a shorter communicable distance).

Here, it is assumed that an (A) portable terminal 300 in FIG. 2 is at a position in the periphery of the vehicle 1 and in a range in which the (A) portable terminal 300 can communicate with the wireless communication device 130 in the first communication system. It is assumed that a (B) portable terminal 300 in FIG. 2 is at a position in the house 200. It is assumed that a (C) portable terminal 300 in FIG. 2 is at an outdoor position in a range in which the (C) portable terminal 300 cannot communicate with the wireless communication device 130 in the first communication system and can communicate with the base station (A) 404.

Figure 3:
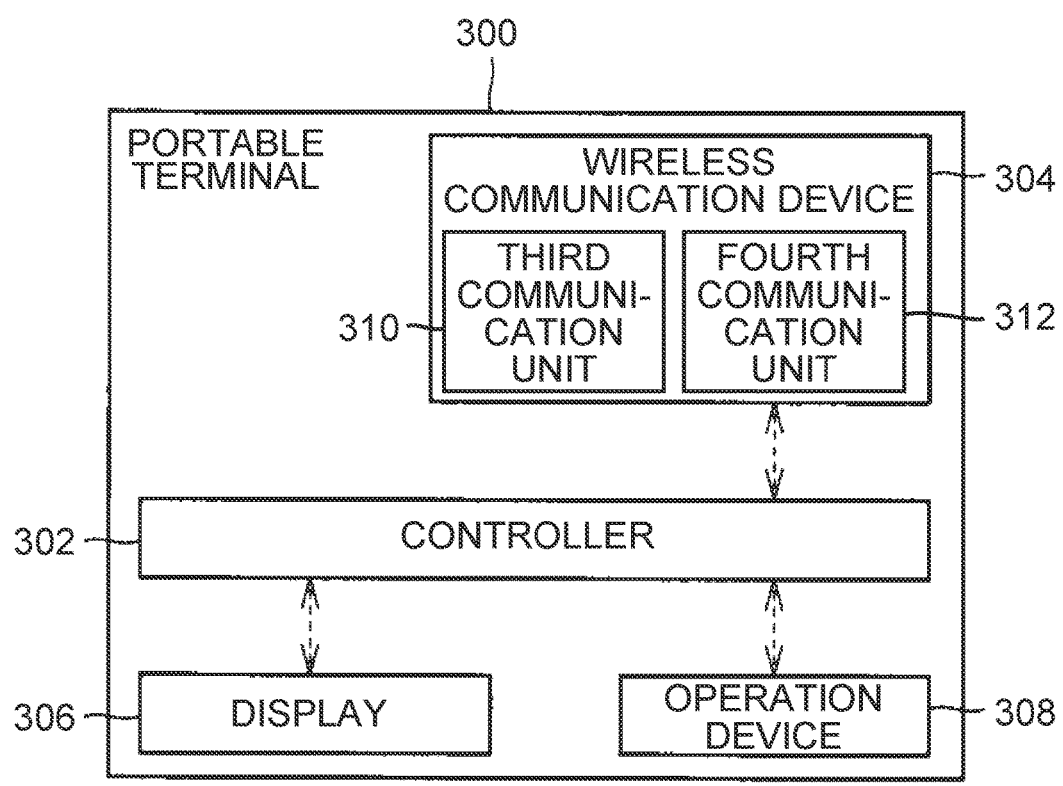
FIG. 3 is a block diagram showing a configuration of a portable terminal.

Next, a specific configuration of the portable terminal 300 that can communicate with the wireless communication device 130 will be described. FIG. 3 is a block diagram showing a configuration of the portable terminal 300. The portable terminal 300 is a user-portable communication terminal, and for example, is a smartphone or a portable phone. The portable terminal 300 includes a controller 302, a wireless communication device 304, a display 306, and an operation device 308 such as a touch panel.

The controller 302 is configured to include a central processing unit (CPU), a memory as a storage device, an input-output buffer and the like, each of which is not illustrated. The controller 302 controls various devices such that the portable terminal 300 becomes a desired actuation state, based on signals from various sensors and devices and a map and program stored in the memory.

For example, the controller 302 of the portable terminal 300 performs a predetermined action such as the display of predetermined information on the display 306 of the portable terminal 300, in response to the operation of the operation device 308 by the user.

The wireless communication device 304 includes a third communication unit 310 and a fourth communication unit 312. The third communication unit 310 is configured to be capable of establishing the communication with the first communication unit 132 in the first communication system in response to a control signal from the controller 302. The fourth communication unit 312 is configured to be capable of establishing the communication with the second communication unit 134 in the second communication system in response to a control signal from the controller 302. By using the third communication unit 310 and the fourth communication unit 312, it is possible to perform the establishment of the communication in the first communication system and the establishment of the communication in the second communication system, in a parallel way.

The controller 302 of the portable terminal 300 can request the display of information about the feed of the electric power, the change in various thresholds or the stop of the feed of the electric power, to the vehicle 1, depending on the operation by the user, and can display the information received from the vehicle 1, on the display 306.

Referring back to FIG. 2, the vehicle ECU 140 is configured to include a central processing unit (CPU), a memory as a storage device, an input-output buffer and the like, each of which is not illustrated. The vehicle ECU 140 controls various devices such that the vehicle 1 becomes a desired actuation state, based on signals from various sensors and devices and a map and program stored in the memory. Each control is not limited to the process by software, and may be processed by dedicated hardware (electronic circuit).

The vehicle ECU 140 is connected to the touch panel display 120, and detects the touch operation on the touch panel display 120. The vehicle ECU 140 controls various devices equipped in the vehicle 1, in response to the detected touch operation, and displays information corresponding to the operation or control, on the touch panel display 120.

The feed device 500 is provided outside of the vehicle 1 and in the periphery of the house 200. The feed device 500 includes an inverter 510, a feed start switch 542, a feed stop switch 544 and a feed ECU 550.

An input part of the inverter 510 is connected to the other end of the connection cable 600. An output part of the inverter 510 is connected to the switchboard 206 in the house 200. The inverter 510 converts the direct-current electric power from the battery 80 into alternating-current electric power, and supplies the alternating-current electric power after the conversion, to the switchboard 206 in the house 200, in response to a control signal from the feed ECU 550.

The feed start switch 542 is a switch that the user operates for starting the feed of the electric power. The feed start switch 542 is connected to the feed ECU 550. When the feed start switch 542 is operated, the feed ECU 550 actuates the inverter 510.

The feed stop switch 544 is a switch that the user operates for stopping the feed of the electric power. The feed stop switch 544 is connected to the feed ECU 550. When the feed stop switch 544 is operated, the feed ECU 550 stops the inverter 510. After the start of the feed of the electric power, the feed ECU 550 stops the inverter 510, for example, when the supply of the electric power from the battery 80 is stopped.

The feed ECU 550 is configured to include a CPU, a memory as a storage device, an input-output buffer and the like, each of which is not illustrated. The feed ECU 550 controls the inverter 510 based on signals from various sensors and devices and a map and program stored in the memory.

As shown in FIG. 2, the house 200 further includes an access point 204, in addition to the household electric appliance 202 and switchboard 206 shown in FIG. 1. For example, the access point 204 is an access point for a wireless LAN that has a router function, and is connected to an external communication network (for example, the internet) 400 so as to be capable of communicating. In the communication network 400, a server 402 may be connected separately. The (B) portable terminal 300 in FIG. 2 can be directly connected to the access point 204.

Examples of the household electric appliance 202 include electric appliances such as a television, a refrigerator and an air conditioner. The switchboard 206 connects the utility grid 208 and the household electric appliance 202, when the vehicle 1 and the feed device 500 are not connected by the connection cable 600, or when the vehicle 1 and the feed device 500 are connected by the connection cable 600 but the feed device 500 is not actuated. At this time, the household electric appliance 202 can be actuated by the alternating-current electric power from the utility grid 208.

On the other hand, the switchboard 206 connects the feed device 500 and the household electric appliance 202, when the vehicle 1 and the feed device 500 are connected by the connection cable 600 and the feed device 500 is actuated. At this time, the household electric appliance 202 can be actuated by the alternating-current electric power from the feed device 500.

In the switchboard 206, the supply source of the alternating-current electric power that is connected to the household electric appliance 202 may be selected, for example, by an unillustrated control device. For example, the control device may select the utility grid 208 as the supply source when the alternating-current electric power is not supplied from the feed device 500, and may select the feed device 500 as the supply source when the alternating-current electric power is supplied from the feed device 500.

Communication Between Portable Terminal 300 and Wireless Communication Device 130

In the following, an exemplary action to be performed by the user and an exemplary action to be executed by various devices, which are actions for establishing the communication between the portable terminal 300 and the wireless communication device 130, will be described.

When the communication in the first communication system is established between the first communication unit 132 and the (A) portable terminal 300 in FIG. 2 for the first time, an initial setting is performed. For example, by an operation of the portable terminal 300 by the user (for example, an operation of enabling the function of Bluetooth), the portable terminal 300 can be put into a state where the portable terminal 300 can establish the communication in the first communication system. Furthermore, by an operation of the touch panel display 120 by the user, the first communication unit 132 can transition to an initial setting mode so as to become a retrieval object of the portable terminal 300. Further, by an operation of the portable terminal 300 by the user, the portable terminal 300 can execute a retrieval process of displaying devices in the vicinity that can perform the communication in the first communication system, on the display 306.

When the portable terminal 300 recognizes the first communication unit 132 as a device that can perform the communication in the first communication system, the portable terminal 300 displays information specifying the first communication unit 132 (the name of the device, and the like), on the display 306. When the user performs an operation for selecting the first communication unit 132 as the object of the communication in the first communication system, the portable terminal 300 sends a request for establishing the communication in the first communication system, to the first communication unit 132. When the first communication unit 132 receives the request from the portable terminal 300, the first communication unit 132 permits the sending and receiving of data with the portable terminal 300 and establishes the communication in the first communication system. At this time, information specifying a connection history and a connection destination is stored in each of the portable terminal 300 and the first communication unit 132, and is used for subsequent establishments of the communication in the first communication system, which are automatically executed. The above-described action of the user and the above-described action for the initial setting of various devices, which are actions for establishing the communication, are examples, and the disclosure is not limited to these actions. For example, when the communication in the first communication system is established for the first time, the first communication unit 132 may request the input of a unique password, to the portable terminal 300.

In the embodiment, after the initial setting, in the case where the communication is not established when the portable terminal 300 recognizes the first communication unit 132 as a device that can perform the communication in the first communication system, the portable terminal 300 automatically establishes the communication with the first communication unit 132 in the first communication system.

In the case where the communication in the second communication system is established between the second communication unit 134 and the (B) portable terminal 300 in FIG. 2, for example, the communication in the second communication system on a route adopting the access point 204 as the relay point is established between the second communication unit 134 and the portable terminal 300.

In this case, the establishment of the communication in the second communication system is realized by the establishment of the communication between the portable terminal 300 and the access point 204 and the communication between the access point 204 and the second communication unit 134.

In the case where the communication between each communication device (the portable terminal 300 or the second communication unit 134) and the access point 204 is established, for example, using a wireless communication standard of a wireless LAN or the like, an initial setting is performed when the communication is established for the first time. As the initial setting for example, actions comparable to the above-described initial setting in the case where the communication in the first communication system is established are performed. Therefore, the detailed descriptions are not repeated. The communication between each communication device and the access point 204 is automatically established by the communication device, when the communication device is in a range allowing a mutual communication.

When the communication in the second communication system is established, it is possible to perform the mutual sending and receiving of data, for example, based on information about destinations such as IP addresses and MAC addresses of a communication destination and a communication source.

Alternatively, in the case where the communication in the second communication system is established between the second communication unit 134 and the (B) portable terminal 300 in FIG. 2, for example, the communication in the second communication system on a route adopting the access point 204, the communication network 400 and the base station (B) 406 as relay points is established between the second communication unit 134 and the portable terminal 300.

In this case, the establishment of the communication in the second communication system is realized by the establishment of the communication between the base station (B) 406 and the second communication unit 134 and the communication between the portable terminal 300 and the access point 204.

The communication between the base station (B) 406 and the second communication unit 134 is established, for example, using a wireless communication standard such as 4G. In this case, subscriber information stored in a subscriber identity module (SIM) that is incorporated in the second communication unit 134 is sent to a server of a mobile operator via the base station (B) 406. The comparison between the sent subscriber information and subscriber information saved in the server is performed. Then, if the subscriber information coincides, the sending and receiving of data with the communication destination via the communication network 400 is permitted. The series of comparison actions is automatically performed when the communication between the base station (B) 406 and the second communication unit 134 becomes possible.

Next, in the case where the communication in the second communication system is established between the second communication unit 134 and the (C) portable terminal 300 in FIG. 2, for example, the communication in the second communication system on a route adopting the base station (A) 404, the communication network 400 and the access point 204 as relay points is established between the second communication unit 134 and the portable terminal 300.

In this case, the communication in the second communication system is realized by the establishment of the communication between the base station (A) 404 and the portable terminal 300 and the communication between the access point 204 and the second communication unit 134.

Alternatively, in the case where the communication in the second communication system is established between the second communication unit 134 and the (C) portable terminal 300 in FIG. 2, the communication in the second communication system on a route adopting the base station (B) 406, the communication network 400 and the base station (A) 404 as relay points is established between the second communication unit 134 and the portable terminal 300.

In this case, the communication in the second communication system is realized by the establishment of the communication between the base station (A) 404 and the portable terminal 300 and the communication between the base station (B) 406 and the second communication unit 134. The communication between the base station (A) 404 and the portable terminal 300 is established, for example, using a wireless communication standard such as 4G.

Selection of Feed Mode

In the vehicle 1 having the above-described configuration, the selection of the feed mode can be performed, for example, using the touch panel display 120. However, in the case where the feed mode is selected using the touch panel display 120, the user has to move between the interior and exterior of the vehicle 1 until the feed of the electric power is started, and the operation for the feed of the electric power can be inconvenient. In the following, specific actions of the user and the vehicle ECU 140 when the feed of the electric power is performed using the touch panel display 120 will be described.

Figure 4:
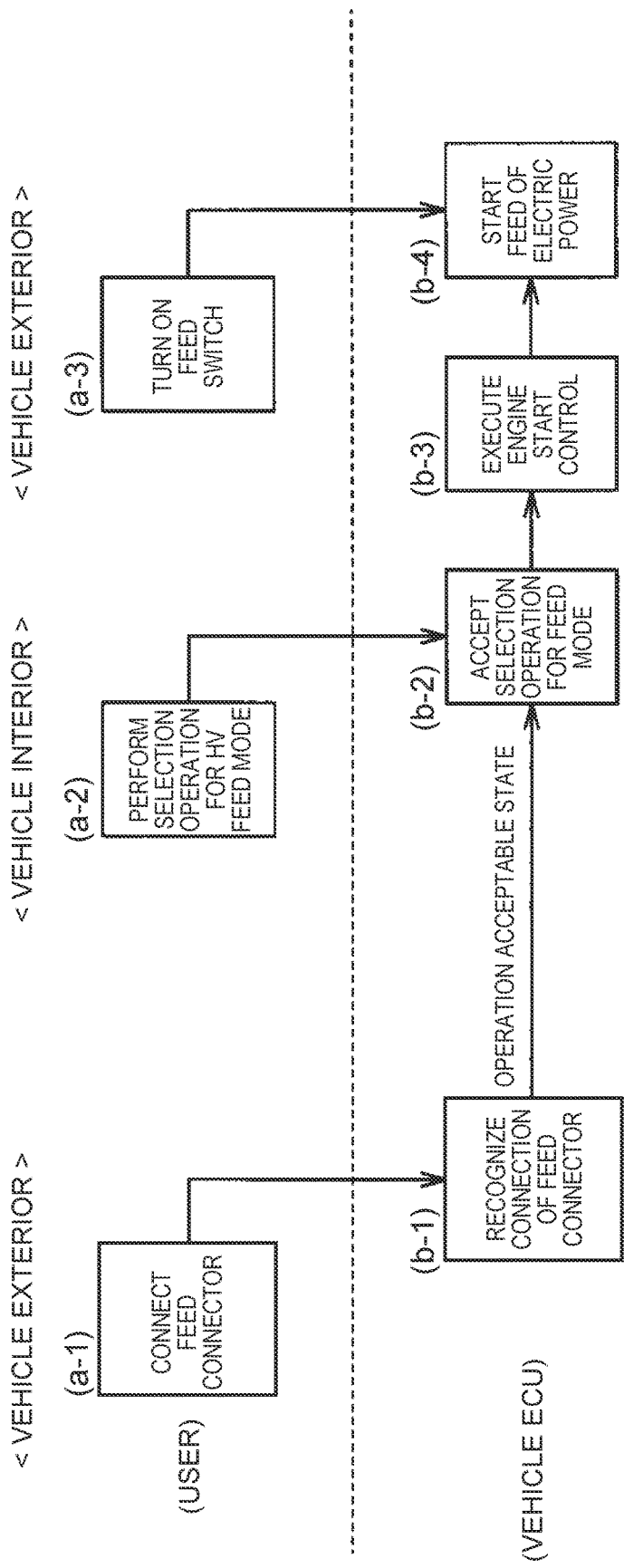
FIG. 4 is a diagram for describing an action of a user and an action of a vehicle ECU when a feed mode is selected using a touch panel display in an interior of a vehicle.

FIG. 4 is a diagram for describing an action of the user and an action of the vehicle ECU 140 when the feed mode is selected using the touch panel display 120 in the interior of the vehicle. It is assumed that the engine 10 is in a stop state, for example.

As shown in (a-1) of FIG. 4, when the user performs the feed of the electric power to the house 200 using the electric power of the battery 80 of the vehicle 1 and/or the electric power generated by the first MG 20 that is an electric power generating device, the user attaches the feed connector 610 to the DC outlet 110 of the vehicle 1, in the exterior (vehicle exterior) of the vehicle 1.

As shown in (b-1) of FIG. 4, the vehicle ECU 140 recognizes that the feed connector 610 has been connected. Then, the vehicle ECU 140 displays the selection screen on the touch panel display 120 in the interior of the vehicle 1, and becomes a state where the vehicle ECU 140 can accept the operation for selecting the feed mode (operation acceptable state).

As shown in (a-2) in FIG. 4, it is assumed that the user moves to the interior of the vehicle 1, operates the touch panel display 120 and performs an operation of selecting the HV feed mode, for example. At this time, as shown in (b-2) of FIG. 4, the vehicle ECU 140 accepts the selection operation by the user, and selects the HV feed mode. Therefore, as shown in (b-3) of FIG. 4, the vehicle ECU 140 executes an engine start control of starting the engine 10.

As shown in (a-3) of FIG. 4, the user moves to the exterior of the vehicle 1 again, and operates the feed start switch 542 of the feed device 500. Thereby, as shown in (b-4) of FIG. 4, the feed of the electric power is started in the HV feed mode.

Thus, in the case where the user starts the feed of the electric power by operating the touch panel display 120, the user has to move between the interior and exterior of the vehicle 1, and sometimes, cannot perform a convenient electric power feed.

Furthermore, when the user selects the HV feed mode involving the action of the engine 10, it is desired that the user be at a place where the user can confirm whether the situation in the vicinity of the vehicle 1 is a situation in which the start of the engine 10 may be permitted.

However, if the user needs to be at a place where the user can confirm the situation in the vicinity of the vehicle for various operations about the feed of the electric power, the user cannot perform an operation such as the check of the feed condition at a remote location, for example, using the portable terminal 300, and sometimes, cannot perform a convenient electric power feed.

Hence, in the embodiment, the feed system 2 includes a feed mode controller that is configured to enable the HV feed mode to be selected by the operation of the portable terminal 300 when the communication in the first communication system is established between the portable terminal 300 and the vehicle 1 and that is configured to disable the HV feed mode from being selected by the operation of the portable terminal 300 when the communication in the first communication system is not established between the portable terminal 300 and the vehicle 1.

Thereby, when the communication in the first communication system is established, the user can select the HV feed mode even outside of the vehicle, by using the portable terminal 300 in a range of the distance allowing the communication with the vehicle 1 in the first communication system. Therefore, it is possible to perform a convenient electric power feed. Further, the distance in which the communication can be established without passing through the relay point is a close distance from the vehicle 1, and therefore, the user can select the HV feed mode in a situation in which the user can confirm the vicinity of the vehicle 1. Furthermore, when the communication in the first communication system is not established, the user is likely to be at a remote location. Therefore, in such a case, the HV feed mode is disabled from being selected by the operation of the portable terminal 300, and thereby, it is possible to inhibit the HV feed mode from being selected at a remote location.

In the embodiment, a case where the "feed mode controller" is realized by the controller 302 of the portable terminal 300 will be described as an example.

Figure 5:
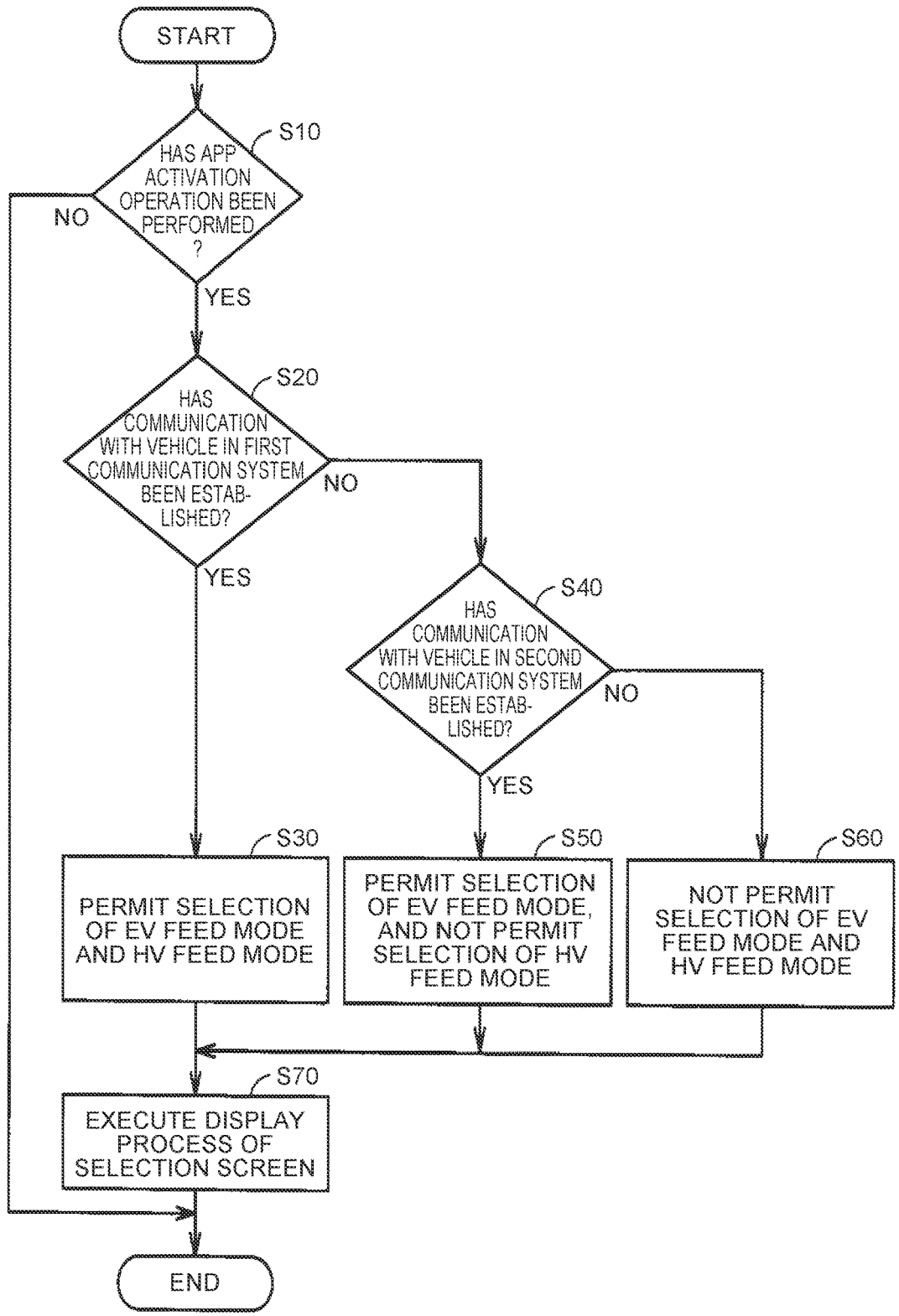
FIG. 5 is a flowchart showing a process that is executed by a controller of the portable terminal.

In the following, a control process that is executed by the controller 302 of the portable terminal 300 will be described with use of FIG. 5. FIG. 5 is a flowchart showing the control process that is executed by the controller 302 of the portable terminal 300. The process shown in the flowchart is executed by being called from a main routine (not illustrated) that is executed in a predetermined control cycle (=unit time) by the controller 302.

As shown in FIG. 5, in step 10 (hereinafter, step is denoted by "S"), the controller 302 determines whether an operation of activating an application (hereinafter, referred to as merely an app) for performing operations about the feed of the electric power has been performed. For example, the controller 302 determines that the operation of activating the app has been performed, when an operation of selecting an icon or the like for activating the app, which is an icon or the like displayed on the display 306, has been performed to the operation device 308. In the case where it is determined that the operation of activating the app has been performed (YES in S10), the process transitions to S20.

In S20, the controller 302 determines whether the communication with the vehicle 1 in the first communication system has been established. For example, the controller 302 puts a first flag into an on-state when the communication with the vehicle 1 in the first communication system has been established, and puts the first flag into an off-state when the communication with the vehicle 1 in the first communication system has been terminated. The controller 302 may determine whether the communication with the vehicle 1 in the first communication system has been established, based on the state of the first flag. In the case where it is determined that the communication with the vehicle 1 in the first communication system has been established (YES in S20), the process transitions to S30.

In S30, the controller 302 permits the selection of each of the EV feed mode and the HV feed mode. For example, the controller 302 puts each of a selection permission flag for the EV feed mode and a selection permission flag for the HV feed mode, into an on-state.

In S40, the controller 302 determines whether the communication with the vehicle 1 in the second communication system (specifically, the communication between the second communication unit 134 and the fourth communication unit 312) has been established. For example, the controller 302 puts a second flag into an on-state when the communication with the vehicle 1 in the second communication system has been established, and puts the second flag into an off-state when the communication with the vehicle 1 in the second communication system has been terminated. The controller 302 may determine whether the communication with the vehicle 1 in the second communication system has been established, based on the state of the second flag. In the case where it is determined that the communication with the vehicle 1 in the second communication system has been established (YES in S40), the process transitions to S50.

In S50, the controller 302 permits the selection of the EV feed mode, and does not permit the selection of the HV feed mode. For example, the controller 302 puts the selection permission flag for the EV feed mode into an on-state, and puts the selection permission flag for the HV feed mode into an off-state.

In S60, the controller 302 does not permit the selection of each of the EV feed mode and the HV feed mode. For example, the controller 302 puts each of the selection permission flag for the EV feed mode and the selection permission flag for the HV feed mode, into the off-state.

In S70, the controller 302 executes a display process of the selection screen. For example, the controller 302 displays, on the display 306, a selection screen having the same display configuration as the selection screen for the feed mode that is displayed on the touch panel display 120 in FIG. 1.

In this case, when the selection permission flag for the HV feed mode is in the on-state, the controller 302 enables HV feed mode to be selected by the operation of the operation device 308. On the other hand, when the selection permission flag for the HV feed flag is in the off-state, the controller 302 disables the HV feed mode from being selected by the operation of the operation device 308.

When the selection permission flag for the HV feed mode is in the on-state, the controller 302, for example, may enable the HV feed mode to be selected by displaying a rectangular region in which a character string "HV FEED MODE" is displayed and making the selection operation acceptable.

When the selection permission flag for the HV feed mode is in the off-state, the controller 302, for example, may disable the HV feed mode from being selected by not displaying the rectangular region. Alternatively, when the selection permission flag for the HV feed mode is in the off-state, the controller 302, for example, may disable the HV feed mode from being selected, by adopting, as the display form of the rectangular region, a different display form (for example, gray-out) from the display form when the selection permission flag for the HV feed mode is in the on-state and not accepting the selection operation even when the selection operation is performed.

Similarly, when the selection permission flag for the EV feed mode is in the on-state, the controller 302 enables the EV feed mode to be selected by the operation of the operation device 308. On the other hand, when the selection permission flag for the EV feed mode is in the off-state, the controller 302 disables the EV feed mode from being selected by the operation of the operation device 308. An action for enabling the EV feed mode to be selected and an action for disabling the EV feed mode from being selected are the same as the above-described actions for the HV feed mode, and therefore, the detailed descriptions are not repeated.

Here, when both the communication in the first communication system and the communication in the second communication system are established between the portable terminal 300 and the wireless communication device 130, it is possible to select the HV feed mode using the portable terminal 300, since at least the communication in the first communication system is established (YES in S20).

Figure 6:
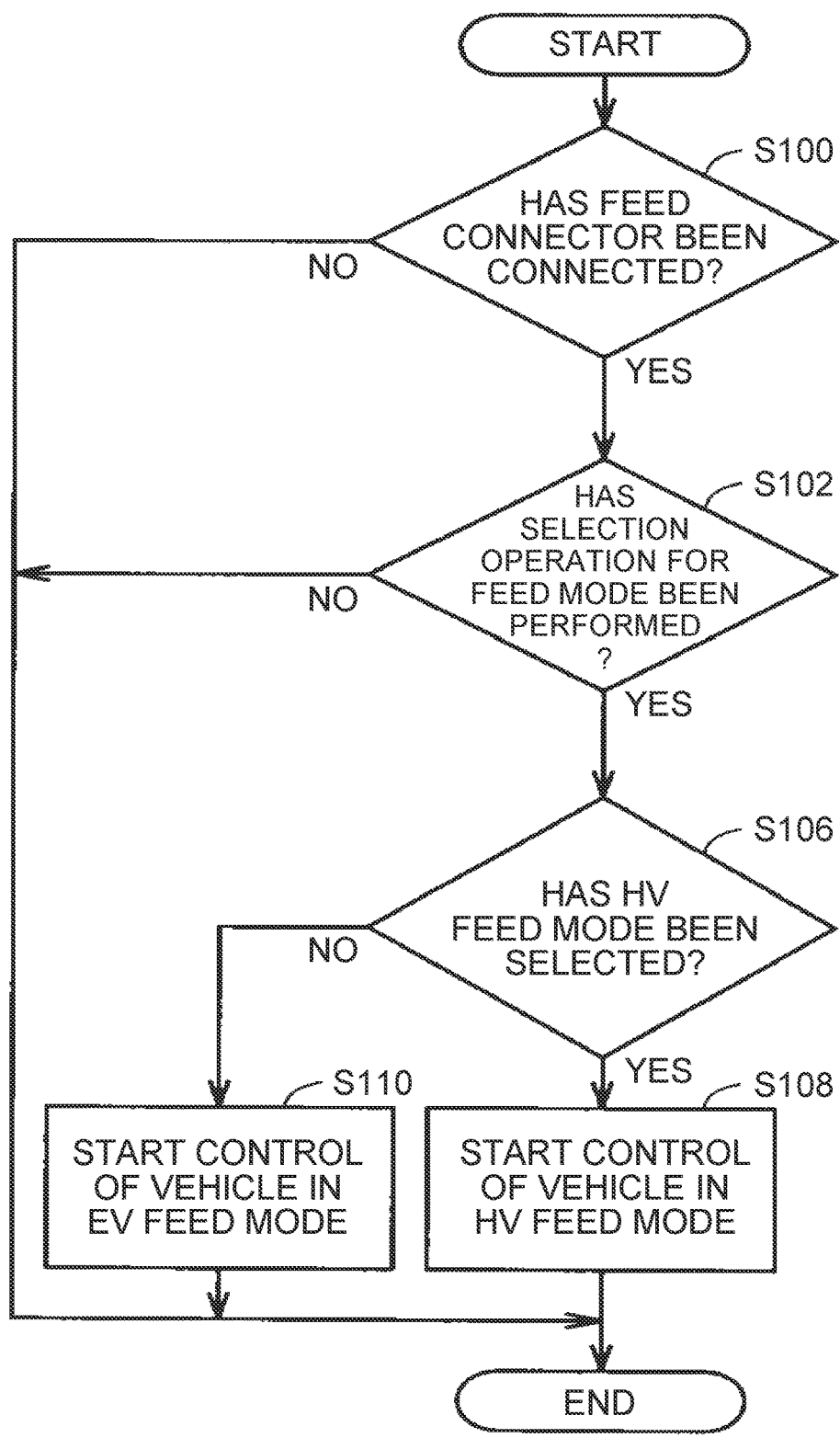
FIG. 6 is a flowchart showing a control process that is a process for selecting the feed mode and that is executed by a vehicle ECU equipped in a hybrid vehicle according to an embodiment.

In the following, a control process that is executed by the vehicle ECU 140 will be described with use of FIG. 6. FIG. 6 is a flowchart showing a control process that is a process for selecting the feed mode and that is executed by the vehicle ECU 140 equipped in the vehicle 1 according to the embodiment. The process shown in the flowchart is executed by being called from a main routine (not illustrated) that is executed in a predetermined control cycle (=unit time) by the vehicle ECU 140.

As shown in FIG. 6, in S100, the vehicle ECU 140 determines whether the feed connector 610 has been connected to the DC outlet 110. For example, the DC outlet 110 may be provided with a sensor or a detection circuit that detects the connection of the feed connector 610, and the vehicle ECU 140 may determine whether the feed connector 610 has been connected to the DC outlet 110 based on a signal that is sent from the sensor or the detection circuit. For example, the sensor or the detection circuit that detects the connection of the feed connector 610 may be a switch that becomes an on-state in conjunction with the connection of the feed connector 610 to the DC outlet 110, or may be a voltage sensor that detects a voltage change due to a change in circuit resistance caused by the attachment of the feed connector 610. In the case where it is determined that the feed connector 610 has been connected to the DC outlet 110 (YES in S100), the process transitions to S102.

In S102, the vehicle ECU 140 determines whether the selection operation for the feed mode has been performed. For example, the vehicle ECU 140 determines that the selection operation for the feed mode has been performed, when a touch operation has been performed to the rectangular region that is displayed on the touch panel display 120 and in which the character string of either of the feed modes is displayed. Alternatively, the vehicle ECU 140 determines that the selection operation for the feed mode has been performed, based on information received from the portable terminal 300 via the wireless communication device 130.

For example, when the portable terminal 300 accepts the operation of selecting one of the EV feed mode and the HV feed mode, the portable terminal 300 sends information specifying the selected feed mode to the vehicle ECU 140 via the wireless communication device 130. When the vehicle ECU 140 receives the information, the vehicle ECU 140 determines that the selection operation for the feed mode has been performed. In the case where it is determined that the selection operation for the feed mode has been performed (YES in S102), the process transitions to S106.

In S106, the vehicle ECU 140 determines whether the HV feed mode has been selected. In the case where it is determined that the HV feed mode has been selected (YES in S106), the process transitions to S108.

In S108, the vehicle ECU 140 starts the control of the vehicle 1 in the HV feed mode. Specifically, the vehicle ECU 140 actuates the engine 10, for example, by executing the engine start control.

On the other hand, in the case where it is determined that the HV feed mode has not selected (that is, in the case where it is determined that the EV feed mode has been selected) (NO in S106), the process transitions to S110.

In S110, the vehicle ECU 140 starts the control of the vehicle 1 in the EV feed mode. Specifically, the vehicle ECU 140 stops the engine 10.

In the case where it is determined in S100 that the feed connector has not been connected (NO in S100) or in the case where it is determined in S102 that the selection operation for the feed mode has not been performed (NO in S102), the vehicle ECU 140 ends the process.

Figure 7:
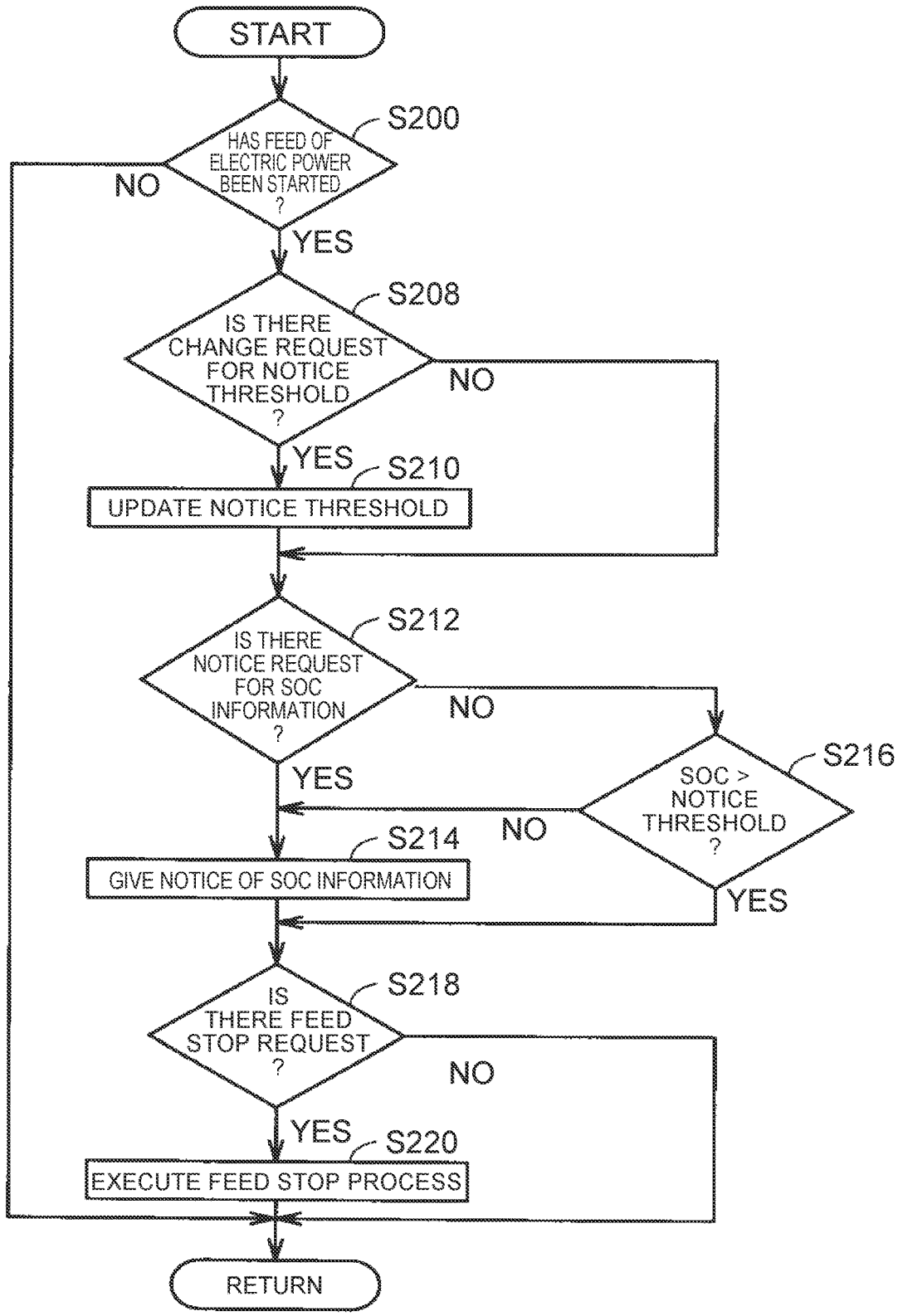
FIG. 7 is a flowchart showing a control process that is a process after the start of the feed of electric power and that is executed by the vehicle ECU equipped in the hybrid vehicle according to the embodiment.

Next, an exemplary operation about the feed of the electric power using the portable terminal 300 after the feed of the electric power is started will be described with reference to FIG. 7. FIG. 7 is a flowchart showing a control process that is a process after the start of the feed of the electric power and that is executed by the vehicle ECU 140 equipped in the vehicle 1 according to the embodiment. The process shown in the flowchart is repeatedly executed in a predetermined control cycle (=unit time).

As shown in FIG. 7, in S200, the vehicle ECU 140 determines that the feed of the electric power has been started. For example, the vehicle ECU 140 may determine that the feed of the electric power has been started, when the feed connector 610 has been connected and the feed current detected by the current sensor 150 is larger than a feed threshold. In the case where it is determined that the feed of the electric power has been started (YES in S200), the process transitions to S208.

In S208, the vehicle ECU 140 determines whether there is a change request for a notice threshold about a notice of state-of-charge (SOC) information of the battery 80.

During the running of the app, when the feed of the electric power is started, a setting screen for performing a preset action about the feed of the electric power is displayed on the display 306 of the portable terminal 300. For example, the present action includes at least of an action of changing a first threshold of the SOC of the electric storage device, which is a threshold for giving a notice of the information (hereinafter, referred to as SOC information) about the SOC of the battery 80, an action of requesting the notice of the SOC, and an action of stopping the feed of the electric power. For example, the setting screen displays a menu allowing the change request for the notice threshold of the SOC about the notice of the SOC information, a notice request for the SOC information and a stop request for the feed of the electric power. When each request is selected by the operation of the operation device 308 by the user, information indicating the selected request is sent to the wireless communication device 130.

For example, the vehicle ECU 140 determines that there is the change request for the notice threshold, when the vehicle ECU 140 receives the information indicating the change request from the portable terminal 300. Alternatively, the vehicle ECU 140 may determine that there is the change request for the notice threshold, when the vehicle ECU 140 accepts a change operation for the notice threshold on the touch panel display 120. In the case where it is determined that there is the change request for the notice threshold (YES in S208), the process transitions to S210.

In S210, the vehicle ECU 140 updates the notice threshold. For example, the vehicle ECU 140 may acquire a value input as a new notice threshold to the portable terminal 300 by the user, from the portable terminal 300, and may perform the update so as to set the acquired value as a new notice threshold. Alternatively, the vehicle ECU 140 may perform the update so as to set a value resulting from subtracting a preset value from the current value, as a new notice threshold, in accordance with an instruction to decrease the notice threshold input to the portable terminal 300 by the user. Alternatively, the vehicle ECU 140 may perform the update so as to set a value resulting from adding a preset value to the current value, as a new notice threshold, in accordance with an instruction to increase the notice threshold from the user.

In S212, the vehicle ECU 140 determines whether there is a notice request for the SOC information. For example, the vehicle ECU 140 determines that there is the notice request for the SOC information, when the vehicle ECU 140 receives information indicating the notice request from the portable terminal 300. Alternatively, the vehicle ECU 140 may determine that there is the notice request for the SOC information, when the vehicle ECU 140 accepts a predetermined operation indicating the notice request for the SOC information, on the touch panel display 120. In the case where there is the notice request for the SOC information (YES in S212), the process transitions to S214.

In S214, the vehicle ECU 140 performs a process of the notice of the SOC information. The SOC information includes the current value of the SOC of the battery 80. For example, the vehicle ECU 140 calculates an estimated value of the SOC of the battery 80, as the current value, based on the electric current, voltage and temperature of the battery 80. For the estimation of the SOC, a well-known method (for example, an open circuit voltage (OCV) estimation method, an electric current integration method or the like) may be used, and the detailed description is omitted. For example, the vehicle ECU 140 calculates the current value of the SOC at a predetermined time interval.

For example, the vehicle ECU 140 sends the SOC information to the portable terminal 300, and displays the SOC information on the touch panel display 120. The portable terminal 300 displays the received SOC information on display devices such as the display 306, and notifies the user of the SOC information. When the vehicle ECU 140 receives the notice request from the portable terminal 300, the vehicle ECU 140 may display the SOC information only on the portable terminal 300 by sending the SOC information to the portable terminal 300. The SOC information to be displayed is not limited to the current value of the SCO of the battery 80, and for example, may include the current notice threshold, may include the upper limit and lower limit of the SOC, or may include the difference from the upper limit and the difference from the lower limit. As the notice method, a notice with a voice may be given.

In the case where it is determined that there is no notice request for the SOC information (NO in S212), the process transitions to S216. In S216, the vehicle ECU 140 determines whether the SOC of the battery 80 is larger than the notice threshold. In the case where it is determined that the SOC of the battery 80 is larger than the notice threshold (YES in S216), the process transitions to S218. On the other hand, in the case where it is determined that the SOC of the battery 80 is the notice threshold or smaller (NO in S216), the process transitions to S214, and the notice of the SOC information is given.

In S218, the vehicle ECU 140 determines whether there is a feed stop request. For example, when the user performs an operation for the feed stop request (for example, a touch operation to a predetermined button image on the screen) to the portable terminal 300, the portable terminal 300 sends information indicating that the feed stop request has been performed, to the vehicle ECU 140. When the vehicle ECU 140 receives, from the portable terminal 300, the information indicating that the feed stop request has been performed, the vehicle ECU 140 determines that there is the feed stop request. Alternatively, when the vehicle ECU 140 accepts a feed stop operation using the touch panel display 120, the vehicle ECU 140 determines that there is the feed stop request. In the case where it is determined that there is the feed stop request (YES in S218), the process transitions to S220. In S220, the vehicle ECU 140 executes a feed stop process. Specifically, the vehicle ECU 140, for example, executes a control process of putting the SMR 90 and the feed relay 100 into the cut-off state, as the feed stop process. In the case where it is determined that there is no feed stop request (NO in S218), the vehicle ECU 140 ends the process.

Actions of the vehicle 1 according to the embodiment, which are based on the above-described structure and flowcharts, will be described with reference to FIG. 8 to FIG. 10.

Selection Action for Feed Mode Using Portable Terminal 300

Figure 8:
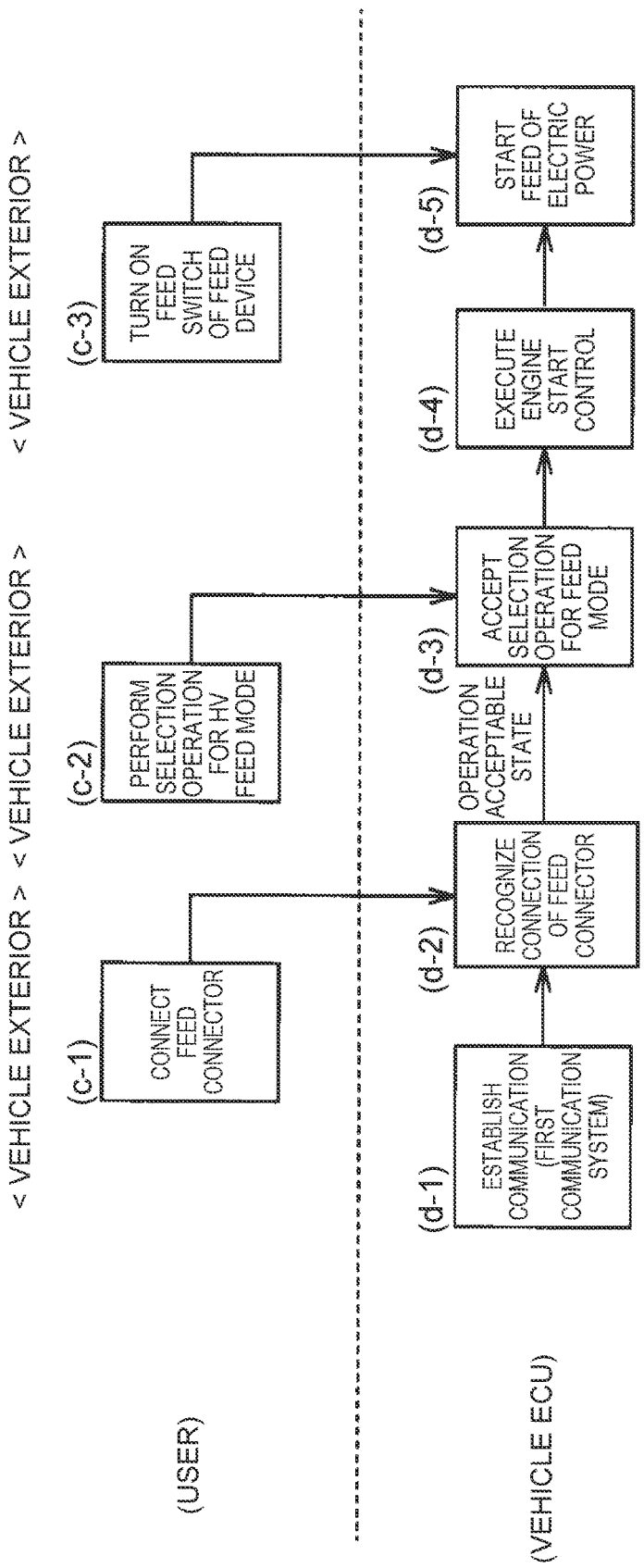
FIG. 8 is a diagram for describing an action of the user and an action of the vehicle ECU when the feed mode is selected using the portable terminal.

FIG. 8 is a diagram for describing an action of the user and an action of the vehicle ECU 140 when the feed mode is selected using the portable terminal 300.

The user carrying the portable terminal 300 comes close to the vehicle 1, and thereby, the distance between the portable terminal 300 and the first communication unit 132 becomes in the range allowing the establishment of the communication in the first communication system. Then, as shown in (d-1) of FIG. 8, the communication in the first communication system is automatically established between the portable terminal 300 and the first communication unit 132.

As shown in (c-1) of FIG. 8, when the feed to the house 200 is performed using the electric power of the battery 80 of the vehicle 1, the user attaches the feed connector 610 to the DC outlet 110 of the vehicle 1 in the exterior of the vehicle 1.

As shown in (d-2) of FIG. 8, the vehicle ECU 140 recognizes that the feed connector 610 has been connected (YES in S100), and then, becomes a state where the vehicle ECU 140 can accept the operation for the selection of the feed mode (S102).

When the user activates the app in the portable terminal 300 (YES in S10), both the selection permission flag for the EV feed mode and the selection permission flag for the HV feed mode become the on-state, because the communication with the vehicle 1 in the first communication system is established (YES in S20). Therefore, the selection screen for the feed mode is displayed such that both the EV feed mode and the HV feed mode are enabled to be selected (S70).

As shown in (c-2) of FIG. 8, the user performs the selection operation for the HV feed mode by operating the portable terminal 300. Then, the information about the selected feed mode is sent to the first communication unit 132. The vehicle ECU 140 receives the information about the feed mode, and thereby, determines that the selection operation for the feed mode has been performed (YES in S102). Then, as shown in (d-3) of FIG. 8, the vehicle ECU 140 accepts the selection operation for the HV feed mode, based on the received information about the feed mode (YES in S106). Therefore, the control of the vehicle 1 is started in the HV feed mode (S108). That is, as shown in (d-4) in FIG. 8, the vehicle ECU 140 executes the engine start control.

As shown in (c-3) of FIG. 8, the user operates the feed start switch 542 of the feed device 500 outside of the vehicle. Thereby, as shown in (d-5) of FIG. 8, the feed of the electric power is started.

Thus, by performing the operations about the feed of the electric power using the portable terminal 300, the user can start the feed of the electric power, without entering the interior of the vehicle 1 after starting the operation of attaching the feed connector 610 to the DC outlet 110 of the vehicle 1.

Here, in the case where the communication in the first communication system is not established (NO in S20) when the user activates the app in the portable terminal 300 (YES in S10), at least the HV feed mode is not permitted to be selected (S50 or S60), and therefore, the selection screen for the feed mode is displayed such that the HV feed mode is disabled from being selected (S70).

Action for Giving Notice of Information Indicating Feed State Using Portable Terminal 300

Next, an action for giving a notice of the information indicating a feed state using the portable terminal 300 after the feed of the electric power is started will be described with reference to FIG. 9. FIG. 9 is a diagram for describing an action of the user and an action of the vehicle ECU 140 when the notice of the SOC information is given in response to the request from the portable terminal 300 after the feed of the electric power is started.

The user carrying the portable terminal 300 moves into the house 200 or comes close to the house 200, and thereby, the distance between the portable terminal 300 and the access point 204 becomes a distance allowing the communication between the two. Then, the communication between the two is automatically established.

Furthermore, the distance between the second communication unit 134 and the access point 204 becomes a range allowing the establishment of the communication in the second communication system, and then, the communication between the two is automatically established. Thereby, as shown in (f-1) of FIG. 9, the communication in the second communication system is established between the second communication unit 134 and the access point 204.

Figure 9:
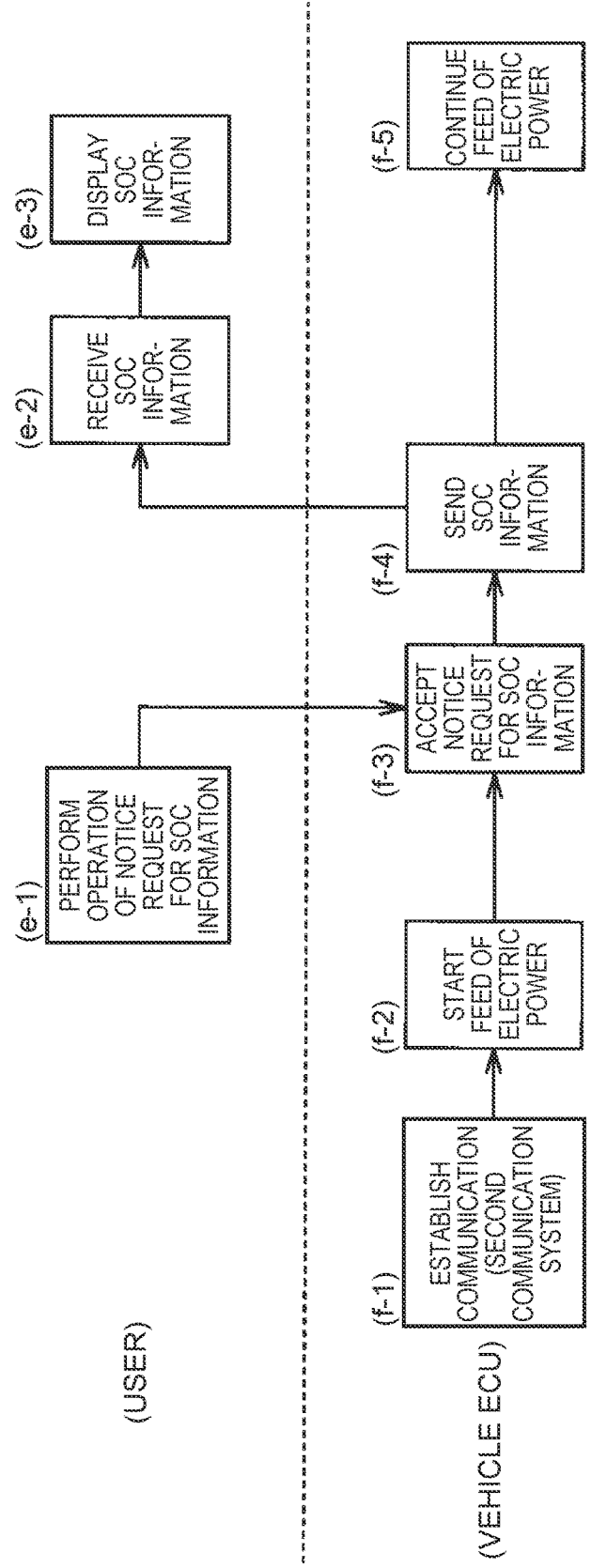
FIG. 9 is a diagram for describing an action of the user and an action of the vehicle ECU when a notice of SOC information is given in response to a request from the portable terminal after the start of the feed of the electric power.

For example, after the feed of the electric power is started as shown in (f-2) of FIG. 9 (YES in S200), whether there is a change request for the notice threshold (S208), whether there is a notice request for the SOC information (S212), whether the SOC is larger than the notice threshold (S216) and whether there is a feed stop request (S218) are sequentially determined.

As shown in (e-1) of FIG. 9, the user performs the operation of requesting the notice of the SOC information of the battery 80, to the portable terminal 300. Then, the vehicle ECU 140 determines that there is the notice request for the SOC information (YES in S212). The vehicle ECU 140 accepts the notice request for the SOC information as shown in (f-3) of FIG. 9, and acquires the current value of the SOC of the battery 80. Then, as shown in (f-4) of FIG. 9, the vehicle ECU 140 sends the SOC information including the acquired current value of the SOC, to the portable terminal 300 (S214).

The portable terminal 300 receives the SOC information from the wireless communication device 130 as shown in (e-2) of FIG. 9, and displays the received SOC information on the display 306 of the portable terminal 300 as shown in (e-3) of FIG. 9.

Meanwhile, in the case where there is no feed stop request (NO in S218), the vehicle ECU 140 continues the feed of the electric power as shown in (f-5) of FIG. 9.

Action for Stopping Feed of Electric Power Using Portable Terminal 300

Next, an action for stopping the feed of the electric power using the portable terminal 300 after the feed of the electric power is started will be described with reference to FIG. 10. FIG. 10 is a diagram for describing an action of the user and an action of the vehicle ECU 140 when the feed of the electric power is stopped in response to the request from the portable terminal 300 after the feed of the electric power is started.

Figure 10:
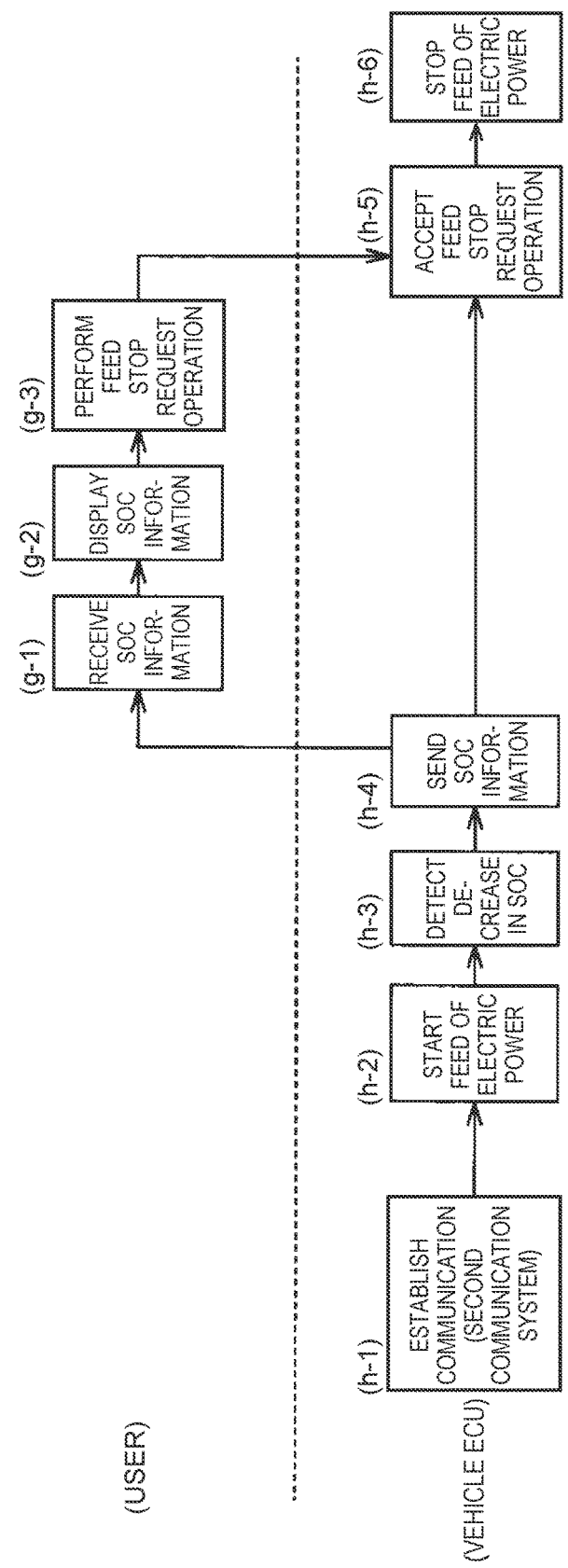
FIG. 10 is a diagram for describing an action of the user and an action of the vehicle ECU when the feed of the electric power is stopped in response to a request from the portable terminal after the start of the feed of the electric power.

For example, similarly to (f-1) of FIG. 9, it is assumed that the communication in the second communication system is established as shown in (h-1) of FIG. 10.

For example, after the feed of the electric power is started as shown in (h-2) of FIG. 10 (YES in S200), whether there is a change request for the notice threshold (S208), whether there is a notice request for the SOC information (S212), whether the SOC is larger than the notice threshold (S216) and whether there is a feed stop request (S218) are sequentially determined as described above.

As described above, the vehicle ECU 140 calculates the current value of the SOC of the battery 80 at a predetermined time interval. When the calculated current value of the SOC of the battery 80 becomes smaller than the notice threshold as shown in (h-3) of FIG. 10 (NO in S216), the vehicle ECU 140 sends the calculated SOC information to the portable terminal 300 as shown in (h-4) of FIG. 10 (S214).

The portable terminal 300 receives the SOC information from the wireless communication device 130 as shown in (g-1) of FIG. 10, and displays the received SOC information on the display 306 of the portable terminal 300 as shown in (g-2) of FIG. 10.

As shown in (g-3) of FIG. 10, the user performs a feed stop request operation to the portable terminal 300 based on the displayed SOC information. Then, as shown in (h-5) of FIG. 10, the vehicle ECU 140 accepts the feed stop request (YES in S218). Therefore, the vehicle ECU 140 executes the feed stop process (S220). That is, as shown in (h-6) of FIG. 10, the vehicle ECU 140 stops the feed of the electric power, by controlling the feed relay 100 and the SMR 90 such that the feed relay 100 and the SMR 90 becomes the cut-off state.

Thus, in the feed system 2 according to the embodiment, when the communication in the first communication system is established, the user can select the HV feed mode or the EV feed mode even outside of the vehicle, by using the portable terminal 300 in the range of the distance allowing the wireless communication with the vehicle 1 in the first communication system. Therefore, it is possible to perform a convenient electric power feed. Further, the distance in which the communication can be established without passing through the relay point is a close distance from the vehicle 1, and therefore, the user can select the HV feed mode in a situation in which the user can confirm the vicinity of the vehicle 1. Furthermore, when the communication in the first communication system is not established, the user is likely to be at a remote location. Therefore, in such a case, the HV feed mode is disabled from being selected by the operation of the portable terminal 300, and thereby, it is possible to inhibit the HV feed mode from being selected at a remote location. Accordingly, it is possible to provide a feed system and a vehicle that can perform a convenient electric power feed in a feed system having a feed mode for feeding electric power while the engine is acting.

Furthermore, when the communication in the first communication system is established between the portable terminal 300 and the vehicle 1 and/or when the communication in the second communication system is established between the portable terminal 300 and the vehicle 1, the portable terminal 300 enables the EV feed mode to be selected. Therefore, by using the portable terminal 300, it is possible to select the EV feed mode even outside of the vehicle. Particularly, when the communication in the second communication system is established, the communication can be performed over a longer distance than when the communication in the first communication system is established, and therefore, it is possible to select the EV feed mode at a remote location. Accordingly, it is possible to perform a convenient electric power feed.

Furthermore, when the communication in the first communication system is not established between the portable terminal 300 and the vehicle 1, the HV feed mode is disabled from being selected on the selection screen of the portable terminal 300, and therefore, it is possible to avoid the HV feed mode from being selected on the portable terminal 300.

Furthermore, when the feed of the electric power to the house 200 is started and the communication in one of the first communication system and the second communication system is established, a preset action about the feed of the electric power can be performed by the operation of the portable terminal 300. Therefore, it is possible to perform the preset action about the feed of the electric power, even at a remote location, through the communication in the second communication system via the relay point, and therefore, it is possible to perform a convenient electric power feed.

In the following, modifications will be described. In the above embodiment, as an example of the communication in the first communication system, the communication using Bluetooth has been described. However, the communication in the first communication system only needs to be a communication in which data can be sent and received without passing through the relay point, as described above, and is not limited to the communication using the Bluetooth. For example, the communication in the first communication system may be a communication using Wi-Fi Direct (R) or infrared light.

In the above-described embodiment, the communication in the first communication system and the communication in the second communication system are automatically established, but may be established by a user's manual operation.

In the above-described embodiment, even when the communication in the first communication system is not established between the portable terminal 300 and the vehicle 1, the EV feed mode can be selected using the portable terminal 300, if the communication in the second communication system is established. However, the disclosure is not particularly limited to such an action. For example, when the communication in the first communication system is not established between the portable terminal 300 and the vehicle 1, both the HV feed mode and the EV feed mode may be disabled from being selected.

Furthermore, in the above-described embodiment, the HV feed mode is a feed mode in which the engine 10 is constantly acting, but is not particularly limited to an electric power supply form in which the engine 10 is constantly acting, as long as it is an electric power supply form in which at least one of the electric power generated using the engine 10 and the electric power of the battery 80 is supplied to the electric load outside of the vehicle 1 in a state where the actuation of the engine 10 is allowable.

For example, in the HV feed mode, until the SOC of the battery 80 becomes equal to the threshold, the electric power of the battery 80 may be supplied to the electric load in the exterior, and when the SOC of the battery 80 becomes smaller than the threshold, the electric power generated using the engine 10 may be supplied to the electric load in the exterior by actuating the engine 10.

Furthermore, in the above-described embodiment, when the SOC of the battery 80 becomes equal to or smaller than the first threshold, the SOC information is sent to the portable terminal 300, and thereby, the notice of the SOC information is given to the user. However, for example, when the remaining level of the fuel of the engine 10 detected by the remaining fuel level sensor 170 becomes equal to or smaller than a second threshold, information about the remaining level of the fuel may be sent to the portable terminal 300. The information about the remaining level of the fuel may include, for example, a feed available time in the HV feed mode based on the remaining level of the fuel, the lower limit of the remaining level, and the difference between the remaining level and the lower limit. Further, it is allowable to adopt a configuration in which the second threshold can be changed by the operation of the portable terminal 300.

Furthermore, in the above-described embodiment, in the range of the distance allowing the communication in the first communication system, the HV feed mode is enabled to be selected using the portable terminal 300. However, for example, the vehicle ECU 140 may perform a regulation such as a decrease in the strength of the electric wave to be output by the wireless communication device 130, in a state where the vehicle 1 cannot travel due to system stop or the like, and may set the range of the distance allowing the communication in the first communication system to a range in which the user can confirm the situation in the vicinity of the vehicle 1 (for example, a range in which the user can view the vehicle 1 or a range in which the user can move to the vicinity of the vehicle 1 in a short time). Thereby, when the user requests the selection of the HV feed mode to the vehicle 1 using the portable terminal 300 while suppressing the increase in electric power consumption, the user moves in a range in which the user can confirm the situation in the vicinity of the vehicle 1. Therefore, the user can confirm the situation in the vicinity of the vehicle 1.

Furthermore, when the SOC of the battery 80 becomes the lower limit or when the remaining level of the fuel becomes the lower limit, the vehicle ECU 140 may stop the feed of the electric power by the cut-off of the SMR 90 and the feed relay 100. In this case, for example, it is allowable to adopt a configuration in which the lower limit of the battery 80 can be changed by the operation of the touch panel display 120 or portable terminal 300 by the user.

Furthermore, in the above-described embodiment, the controller 302 of the portable terminal 300 is an example of the "feed mode controller". However, the "feed mode controller" may be realized by the vehicle ECU 140.

In this case, for example, the vehicle ECU 140 is configured to enable the HV feed mode to be selected only when the communication in the first communication system is established between the portable terminal 300 and the vehicle 1. For example, when there is a selection request of the HV feed mode from the portable terminal 300 and the communication in the first communication system is not established between the portable terminal 300 and the vehicle 1, the vehicle ECU 140 prohibits the HV feed mode from being selected.

Thereby, it is possible to perform a convenient electric power feed, and it is possible to inhibit the HV feed mode from being selected at a remote location.

In the following, an exemplary control process that is executed by a vehicle ECU of a feed system 2 according to the modification will be described with use of FIG. 11.

Figure 11:
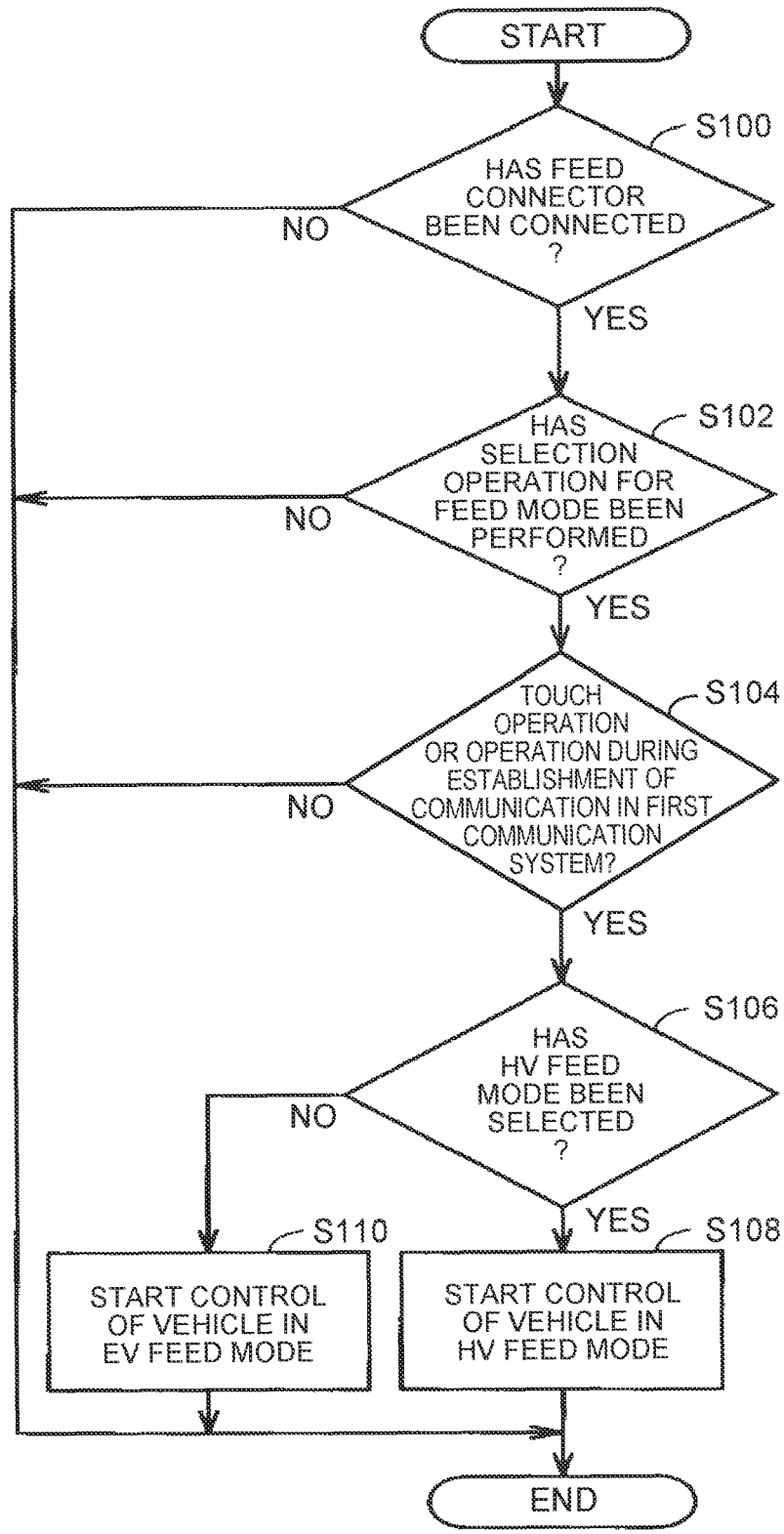
FIG. 11 is a flowchart showing a control process that is a process for selecting the feed mode and that is executed by a vehicle ECU in a modification.

In the flowchart of FIG. 11, the same processes as those in the flowchart of FIG. 6 are denoted by the same step numbers. Therefore, the detailed descriptions are not repeated.

In the case where it is determined in S102 that the selection operation for the feed mode has been performed (YES in S102), the vehicle ECU 140, in S104, determines whether the selection operation for the feed mode is a touch operation, whether the selection operation for the feed mode is an operation of the portable terminal 300 during the establishment of the communication in the first communication system, or whether the selection operation for the feed mode is not any of those operations. In the case where it is determined that the selection operation for the feed mode is a touch operation or in the case where it is determined that the selection operation for the feed mode is an operation of the portable terminal 300 during the establishment of the communication in the first communication system, the process transitions to S106. In the case where the selection operation for the feed mode is not any of those operations (NO in S104), the process is ended.

By such a process, when the communication in the first communication system is not established (S104), the transition to the process for selecting the HV feed mode is avoided, so that the HV feed mode is prohibited from being selected. Then, only when the communication in the first communication system is established, the transition to the process for selecting the HV feed mode becomes possible.

Furthermore, in the above-described embodiment, the "feed mode controller" is realized by the controller 302 of the portable terminal 300. However, for example, in the case where the communication in the second communication system is established between the portable terminal 300 and the vehicle 1 and where the data to be sent and received between the portable terminal 300 and the vehicle 1 passes through the server 402 connected to the communication network 400, the "feed mode controller" may be realized by the server 402. For example, the server 402 may be configured not to perform the selection request for the HV feed mode to the vehicle 1 when the selection of the HV feed mode is requested from the portable terminal 300 in the case where the communication in the second communication system is established between the portable terminal 300 and the vehicle 1 and where the communication in the first communication system is not established. In this case, each or at least one of the portable terminal 300 and the vehicle 1 sends information indicating that the communication in the first communication system has been established between the portable terminal 300 and the vehicle 1, to the server 402, when the communication in the first communication system has been established between the portable terminal 300 and the vehicle 1. Based on the information, the server 402 determines whether the communication in the first communication system has been established between the portable terminal 300 and the vehicle 1.

The above modifications may be carried out while all or some of the modifications are appropriately combined. It should be understood that the embodiments in the present disclosure are examples and are not limitative in all respects. It is intended that the scope of the disclosure is indicated not by the above description but by the scope of the claims and includes all modifications in a meaning and scope equivalent to the scope of the claims.

What is claimed is:

1. A feed system configured to feed electric power in one of a first feed mode and a second feed mode, the feed system comprising:

a vehicle including an engine, an electric power generating device, an electric storage device, an outlet and a wireless communication device, the electric power generating device being configured to generate electric power by dynamic power of the engine, the outlet being configured to be connected to an electric load outside of the vehicle, the wireless communication device being configured to perform wireless communication in at least one of a first communication system and a second communication system, the first communication system being a communication system in which communication with a portable terminal is established without passing through a relay point, the second communication system being a communication system in which the communication with the portable terminal is established while passing through the relay point; and a feed mode controller configured to enable the first feed mode to be selected by an operation of the portable terminal when the communication in the first communication system is established between the portable terminal and the vehicle, and the feed mode controller being configured to disable the first feed mode from being selected by the operation of the portable terminal when the communication in the first communication system is not established between the portable terminal and the vehicle, the first feed mode being a mode in which electric power of at least one of the electric power generating device and the electric storage device is supplied to the electric load when actuation of the engine is allowable, and the second feed mode being a mode in which electric power of the electric storage device is supplied to the electric load when the engine is stopped.

2. The feed system according to claim 1, wherein the feed mode controller is configured to enable the second feed mode to be selected when the communication in the first communication system is established between the portable terminal and the vehicle.

3. The feed system according to claim 1, wherein
the feed mode controller is configured to enable the second feed mode to be selected when the communication in the second communication system is established between the portable terminal and the vehicle.

4. The feed system according to claim 2, wherein
the feed mode controller is configured to disable each of the first feed mode and the second feed mode from being selected when the communication in the first communication system is not established between the portable terminal and the vehicle.

5. The feed system according to claim 1, wherein
the feed mode controller is configured to prohibit the first feed mode from being selected when a selection request for the first feed mode is sent from the portable terminal and the communication in the first communication system is not established between the portable terminal and the vehicle.

6. The feed system according to claim 1, wherein
the portable terminal includes a display device,
the display device is configured to display a selection screen for the first feed mode and the second feed mode, and
the feed mode controller is configured to disable the first feed mode from being selected on the selection screen of the portable terminal when the communication in the first communication system is not established between the portable terminal and the vehicle.

7. The feed system according to claim 1, further comprising
a feed controller configured to enable a preset action about the feed of the electric power by the operation of the portable terminal when the feed of the electric power to the electric load is started and the communication in one of the first communication system and the second communication system is established.

8. The feed system according to claim 7, wherein
the preset action includes at least one of an action of changing a first threshold of a state-of-charge of the electric storage device, an action of changing a second threshold of a remaining level of fuel for the engine, and an action of stopping the feed of the electric power,
the first threshold being a threshold for giving a notice of information about the state-of-charge, and
the second threshold being a threshold for giving a notice of information about the remaining level of the fuel.

9. A vehicle comprising:
an engine;
an electric power generating device configured to generate electric power by dynamic power of the engine;
an electric storage device;
an outlet configured to be connected to an electric load outside of the vehicle;
a wireless communication device configured to perform wireless communication in at least one of a first communication system and a second communication system, the first communication system being a communication system in which communication with a portable terminal is established without passing through a relay point, and the second communication system being a communication system in which the communication with the portable terminal is established while passing through the relay point; and
an electronic control unit configured to execute feed of electric power in one of a first feed mode and a second feed mode, the first feed mode being a mode in which electric power of at least one of the electric power generating device and the electric storage device is supplied to the electric load when actuation of the engine is allowable, the second feed mode being a mode in which electric power of the electric storage device is supplied to the electric load when the engine is stopped,
the electronic control unit being configured to enable the first feed mode to be selected by an operation of the portable terminal only when the communication in the first communication system is established between the portable terminal and the vehicle.

* * * * *

UNITED STATES PATENT AND TRADEMARK OFFICE
CERTIFICATE OF CORRECTION

PATENT NO. : 10,384,555 B2
APPLICATION NO. : 15/801959
DATED : August 20, 2019
INVENTOR(S) : Jun Maeda It is certified that error appears in the above-identified patent and that said Letters Patent is hereby corrected as shown below:

In the Specification

In Column 4, Line 36, delete "Further;" and insert --Further,--, therefor.

In Column 13, Line 27, after "setting", insert --,--.

Signed and Sealed this
Fifth Day of November, 2019

Andrei Iancu
*Director of the United States Patent and Trademark Office*